United States Patent [19]
Kim et al.

[11] Patent Number: 5,799,081
[45] Date of Patent: Aug. 25, 1998

[54] ILLEGAL VIEW/COPY PROTECTION METHOD AND APPARATUS FOR DIGITAL BROADCASTING SYSTEM

[75] Inventors: Yung Gil Kim; Tae Joon Park, both of Seoul, Rep. of Korea

[73] Assignee: LG Electronics Inc., Seoul, Rep. of Korea

[21] Appl. No.: 549,421

[22] Filed: Oct. 27, 1995

[30] Foreign Application Priority Data

Sep. 18, 1995 [KR] Rep. of Korea ............... 30444/1995

[51] Int. Cl.$^6$ ........................................ H04L 9/00
[52] U.S. Cl. ........................... 380/5; 380/4; 380/20
[58] Field of Search ........................ 380/3–5, 20

[56] References Cited

U.S. PATENT DOCUMENTS 4,595,950  6/1986  Lefberg ........................... 380/5
4,945,563  7/1990  Horton et al. ................... 380/5
4,991,208  2/1991  Walker et al. .................. 380/5
5,315,448  5/1994  Ryan .............................. 380/5
5,418,853  5/1995  Kanota et al. .................. 380/5
5,574,787  11/1996  Ryan ............................ 380/5

*Primary Examiner*—Salvatore Cangialosi
*Attorney, Agent, or Firm*—John P. White; Copper & Dunham LLP

[57] ABSTRACT

An illegal view/copy protection method for a digital broadcasting system is disclosed including an audio/video signal transmission step for multiplexing and transmitting audio/video bit stream scrambled in control words and information where the control words and CPTC information for illegal view/copy protection are encrypted; and an audio/video reception step for decrypting the transmitted bit stream to analyze the CPTC information and control words, deciding whether recording is allowed or not to be recorded on cassette tape, and using the control words, performing descrambling and decoding to output audio/video signals to a monitor, thereby protecting copyright.

31 Claims, 20 Drawing Sheets

F I G. 8A
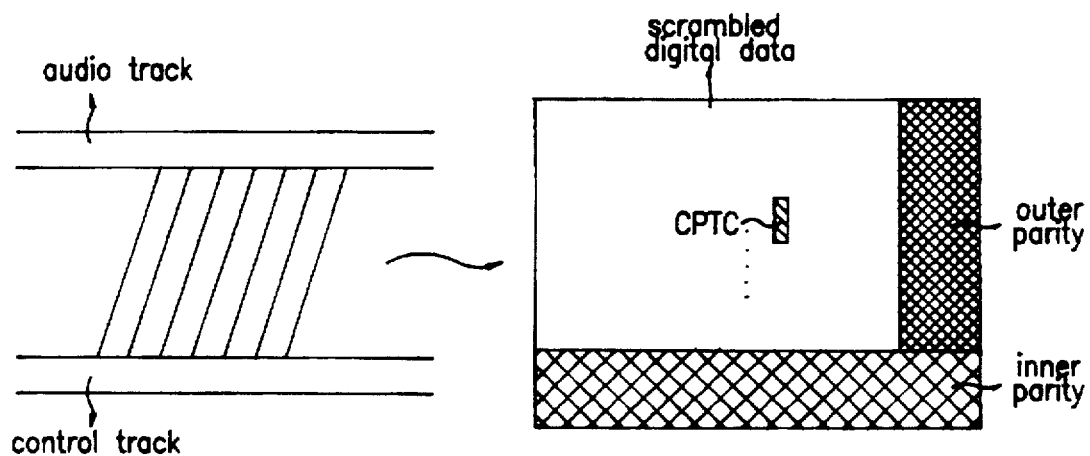
F I G. 8B
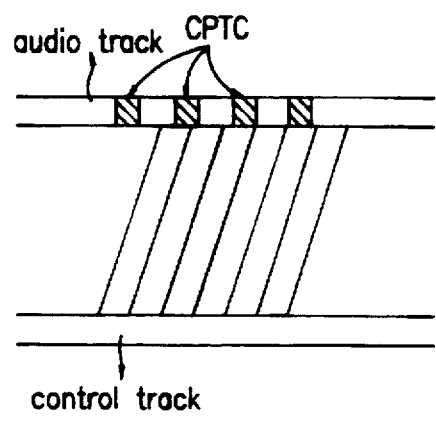
F I G. 8C
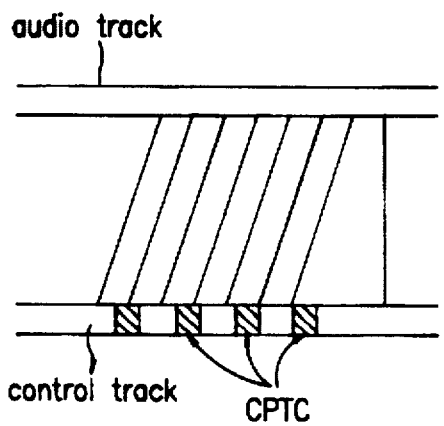
F I G. 8D
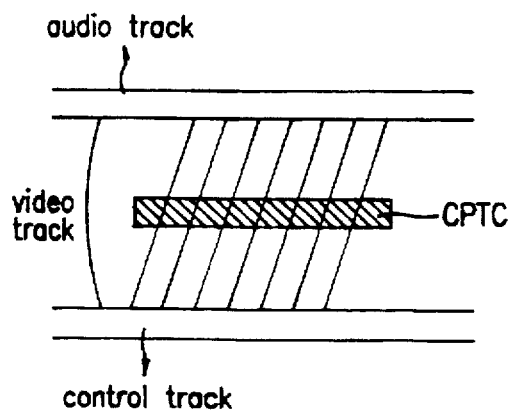

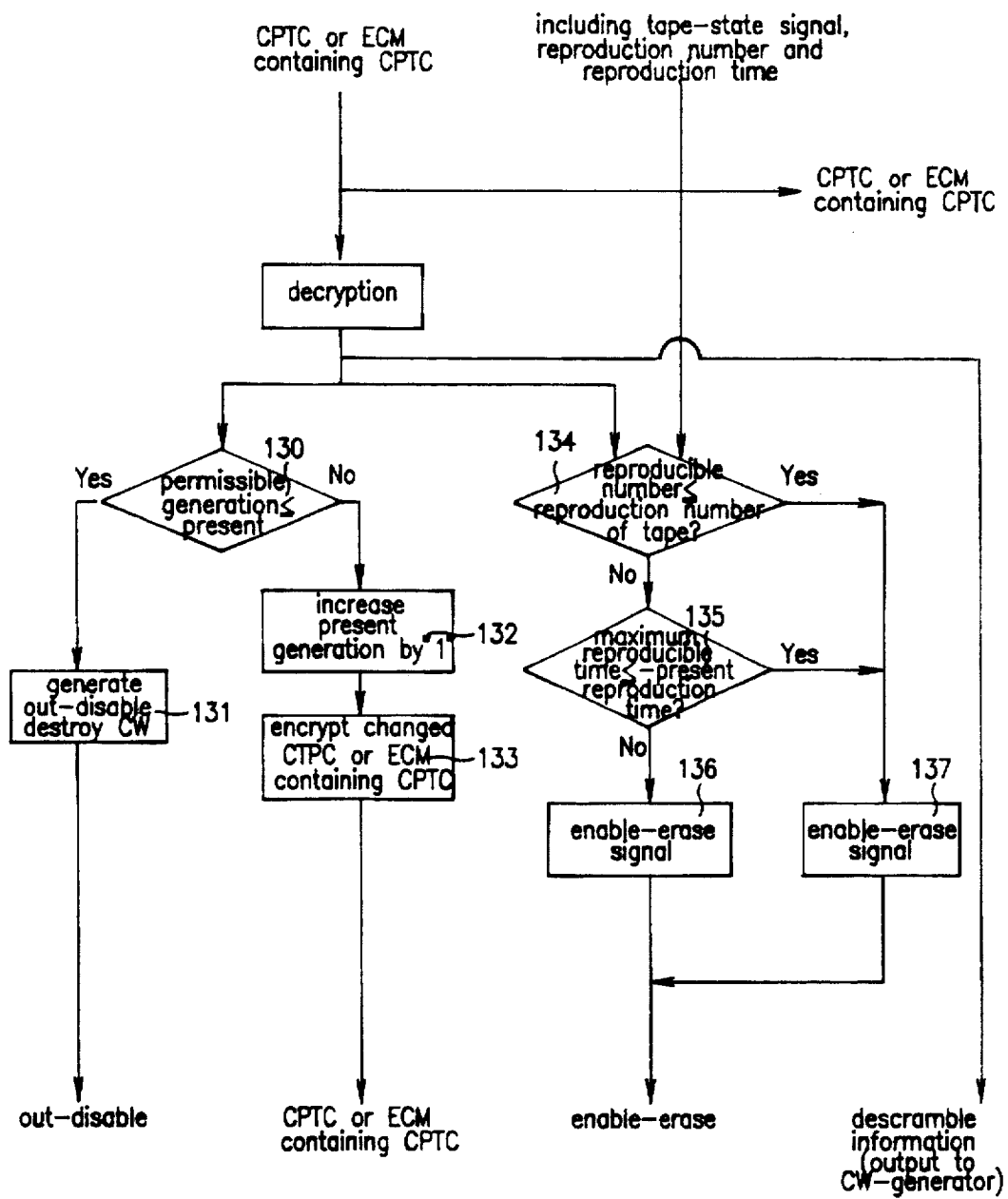
F I G.11

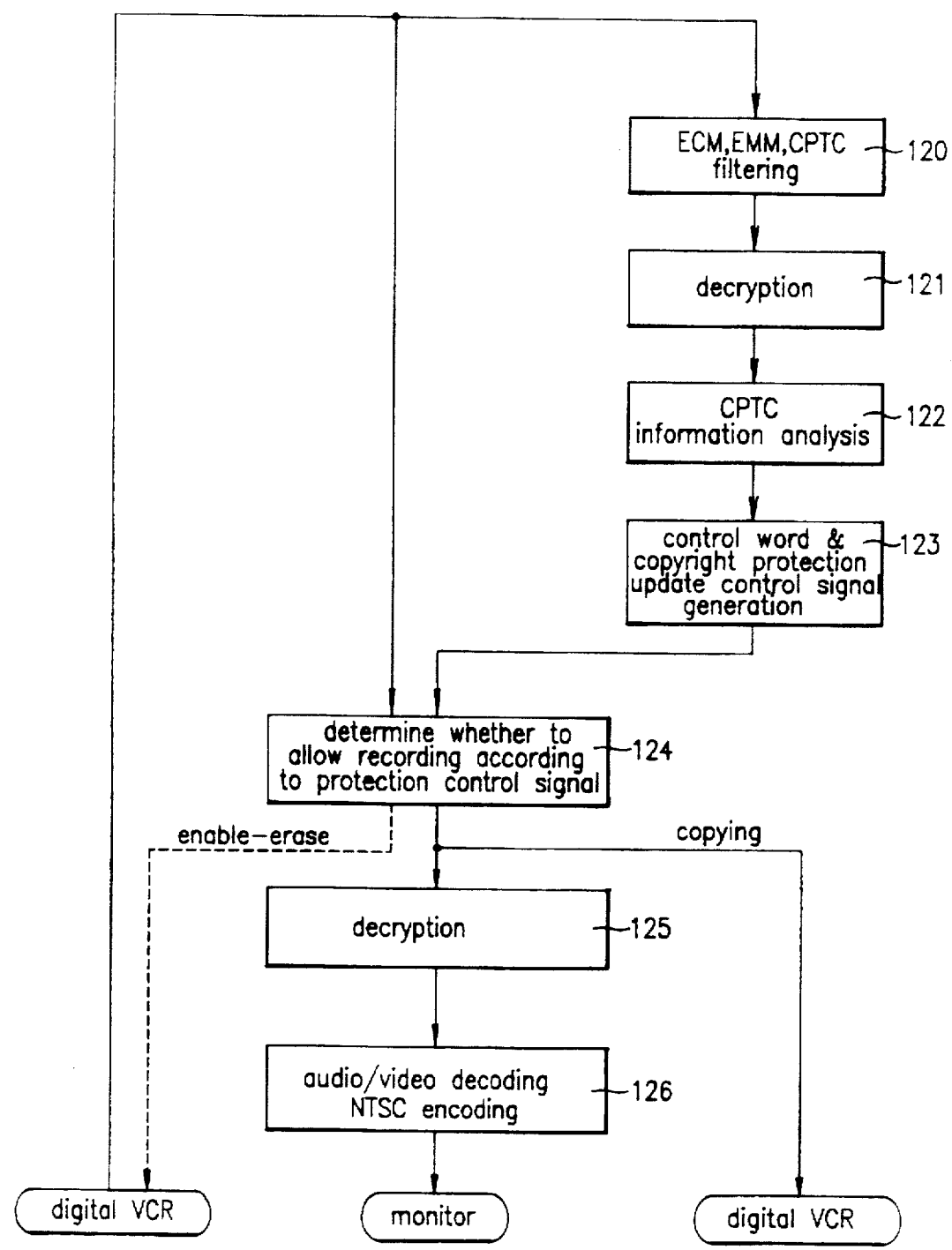
F I G.12

| $ID_1$ | $EMM_1$ |
|--------|---------|
| $ID_2$ | $EMM_2$ |
| $ID_3$ | $EMM_3$ |
| ⋮ | ⋮ |
| $ID_n$ | $EMM_n$ |

| recording/reproduction state | ID | reproduction number |
|---|---|---|

F I G.17A
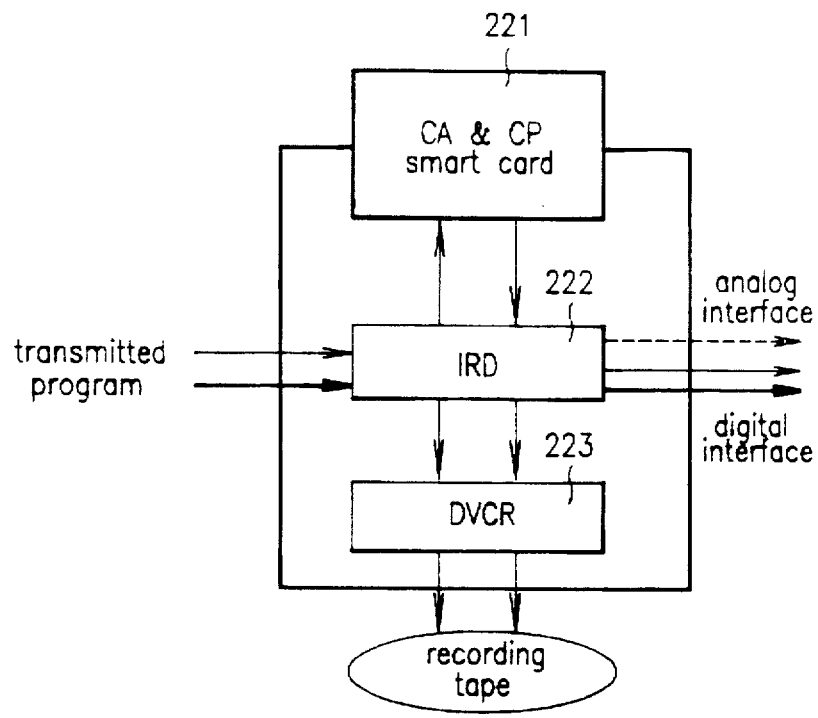
F I G.17B
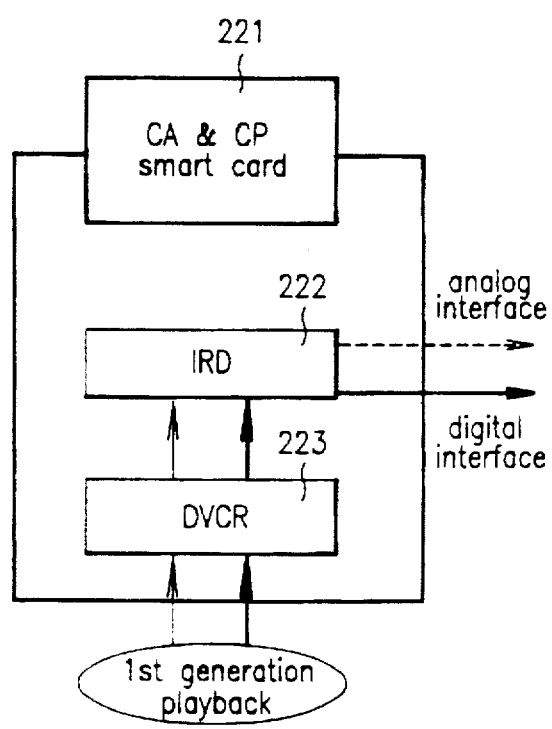

FIG. 18
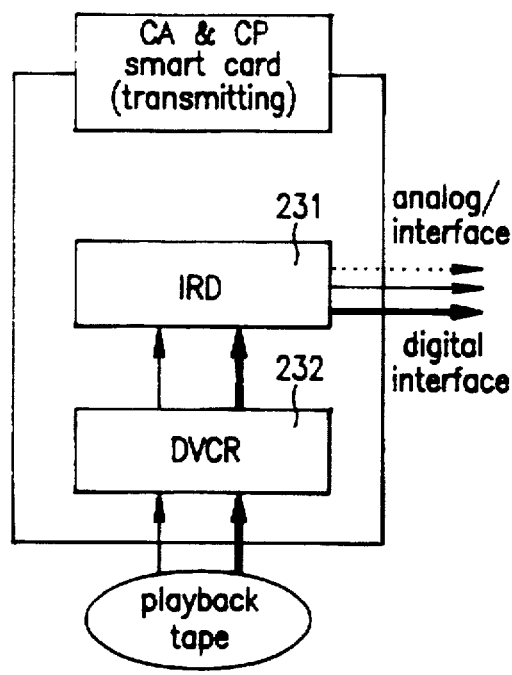
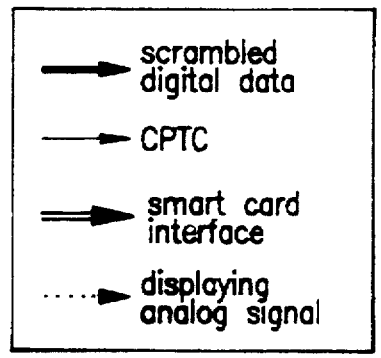
FIG. 19
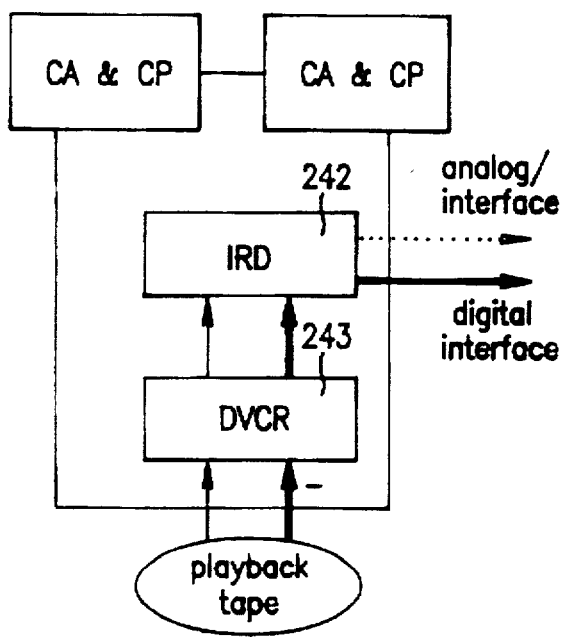
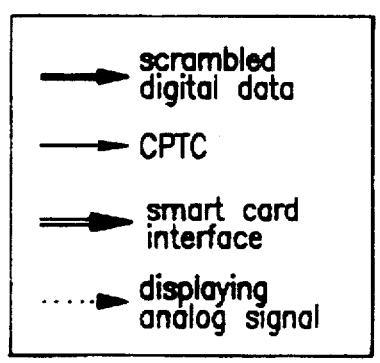

F I G.25
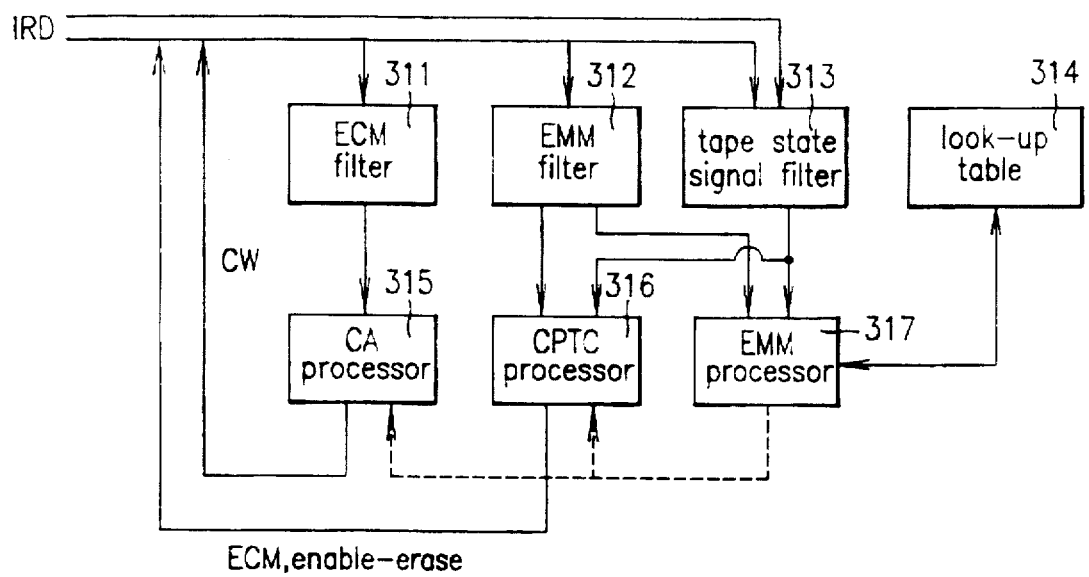
F I G.26
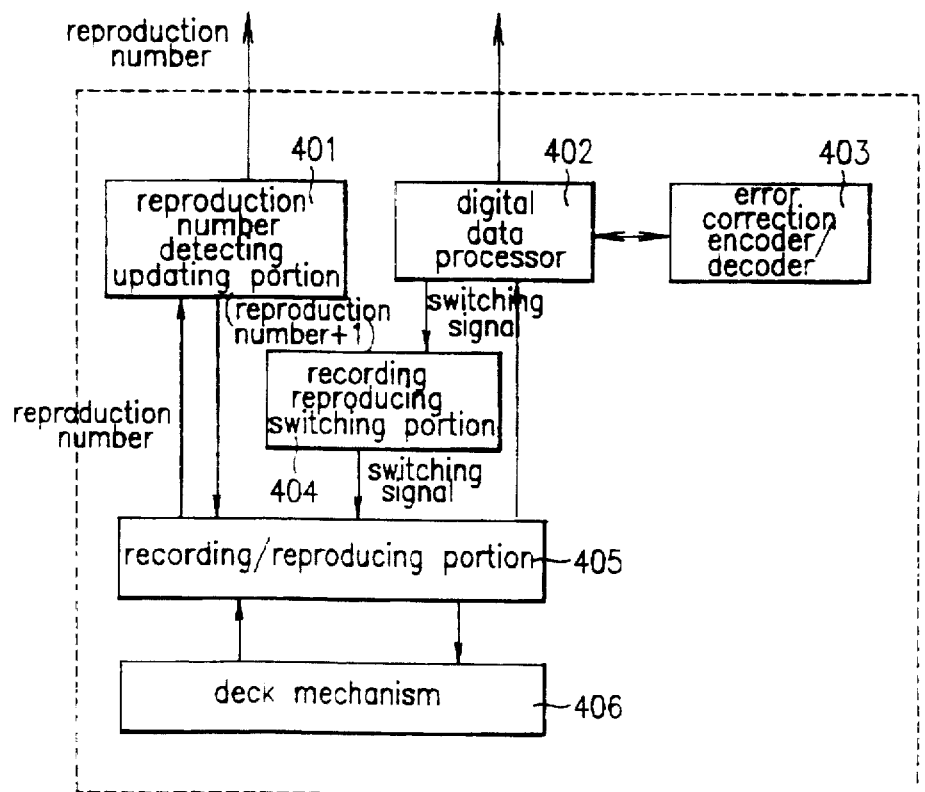

ILLEGAL VIEW/COPY PROTECTION METHOD AND APPARATUS FOR DIGITAL BROADCASTING SYSTEM

BACKGROUND OF THE INVENTION

The present invention relates to an illegal view/copy protection method and apparatus for a digital broadcasting system, in which digital broadcasting performed through broadcasting media such as cable, satellite and terrestrial broadcasting, or through prerecorded media such as video cassette tapes, is prevented from being illegally viewed or copied to thereby protect its copyright.

For conventional systems for copyright protection on digital media, there are Macrovision's intellectual property protection system (IPPS), which is disclosed in U.S. Pat. No. 5,315,448, and the integrated receiver/decoder (IRD), a conditional receiving system for digital broadcasting media, for receiving DirecTV's satellite broadcasting currently transmitted in the US.

The Macrovision's IPPS disclosed in U.S. Pat. No. 5,315, 448 is a copy protection system for a hybrid digital VCR having digital recording functions for both a digital input signal and an analog input signal.

As shown in FIGS. 1 and 2, in operating its copy protection function, Macrovision's IPPS detects, when a digital signal is input, copy protection control bits from an input signal, and when an analog signal is input, detects the analog copy protection waveform from the input signal.

More specifically, as shown in FIG. 2, a signal in which the analog copy protection waveform generated from an analog copy protection generator is added to the analog video output of the output signals of the digital VCR is output and displayed to be normal on an analog TV but distorted on an analog VCR, as shown in FIG. 1. In digital recording of the input signal, the copy protection control bits are changed to prevent digital copy or to permit one-time digital copy.

Referring to FIG. 3, the IPPS comprises an analog copy protection detector (ACP) 2 for detecting the analog copy protection waveform from an input analog NTSC video signal 1, an A/D converter 3 for A/D-converting analog NTSC video signal 1 input according to the signal output from the ACP detector, an AC bit detector 5 for detecting the AC bit from input digital video signal 4, an SCPS bit detector 6 for detecting the SCPS from input digital video signal 4, an AC bit adder 7 for adding the AC bit to input digital video signal 4 according to the SCPS bit output from SCPS bit detector 6, a switch 8 for outputting a signal output from AC bit adder 7 according to the AC bit output from AC bit detector 5, a switch 9 for selecting and outputting the signal output from A/D converter 3 and switch 8, a digital tape deck mechanism/circuit 10 for digitally recording the signal output from switch 9 and outputting a digital video signal, an AC bit detector 11 for detecting the AC bit from the signal output from digital tape deck mechanism/circuit 10, an ACP signal generator 12 for generating the ACP signal from the signal output from AC bit detector 11, and a D/A converter 13 for adding the ACP signal output from ACP signal generator 12 to the signal output from digital tape deck mechanism/circuit 10 and D/A converting the added result which is output as an analog NTSC video signal.

The operation of the IPPS will be explained below.

The copy protection control bits are made up of the AC and SCPS bits. The AC bit is added to recorded digital video data so that if the AC bit is set, digital copy is prohibited and if the SCPS bit is set, one-time digital copy is allowed.

In playback, when the AC bit is detected by AC bit detector 11, the analog copy protection waveform generated from ACP signal generator 12 is added to the analog video signal, which is output to D/A converter 13. Here, as the position of the copy protection control bits of the digital video data,a n area of an MPEC-2 digital copy protection header where one-bit copyright flag and one-bit original-or-copy flag of a PES header are placed is used, or a transport-private-data field area of the transport header of the MPEC-2 is used.

The analog copy protection waveform is a signal which is severely distorted when inserted into the analog NTSC waveform and directly coupled to the analog TV. A method of generating such a signal is presented in U.S. Pat. Nos. 4,613,603 and 4,914,694. Using this method, the IPPS generates the analog copy protection waveform.

Referring to FIG. 4, the IRD, as a conditional receiving system for digital broadcasting media, for receiving the DirecTV's satellite broadcasting currently transmitted in US comprises an outdoor unit (ODU) 21 made up of a satellite antenna for receiving 12 GHz-satellite broadcasting signals and a low noise block converter (LNB) for converting down the received satellite broadcasting signal into a 1 GHz-signal, an IRD 20 for receiving satellite broadcasting from ODU 21 and offering audio and video services to a subscriber's TV or monitor, and an access card 22 required for conditional access (CA) for conditional reception.

Here, IRD 20 performs forward error correction (FEC), decoding, transport demultiplexing, MPEG decoding, NTSC encoding, and audio processing which is a D/A conversion.

Access card 22, whose size is similar to that of a general credit card, has a built-in IC. With this, the card receives CA-related information through a broadcast bit stream and telephone line, that is, a telco MODEM, in order to decide whether a user, subscriber, -selected channel can be viewed or not and to collect its subscription fee.

As shown in FIG. 4, IRD 20 comprises an IR receiver 25 for receiving and processing the subscriber's remote controller input, a telco MODEM 26 which is a general MODEM coupled to the telephone line, a microcomputer 27 made up of an NDC verifier code including software for the CA function and IRD software for IRD driving, a tuner/demodulator/FEC 28 for selecting one channel of the signal received through ODU 21 and converting the selected channel into a digital bit stream for the purpose of error correction, a transport IC 29 for selecting one program of bit streams output from tuner/demodulator/FEC 28 and multiplexed with various programs, and converting the selected program into a bit stream decodable in the MPEG video decoder and MPEG audio decoder, a card reader interface 23 for data communication between transport IC 29 and access card 22, a system memory 24 coupled to transport IC 29 and for intermediate buffering of data, an MPEG video decoder 30 for expanding a video bit stream compressed in the MPEG format, a frame memory 31 for storing video data expanded in MPEG video decoder 30 in units of frame, an encode/sync/anti-tape/D/A 33 for converting the digital video data expanded in MPEG video decoder 30 into the analog NTSC format and inserting horizontal and vertical sync signals H-Sync and V-Sync and a Macrovision-mode analog copy protection signal in the conversion process, an RF modulator 34 for modulating an NTSC signal of the baseband output from encode/sync/anti-tape/D/A 33 into the RF band, an MPEG audio decoder 32 for expanding the audio bit stream compressed in the MPEG format, and a D/A 35 for converting the expanded digital audio data output from MPEG audio decoder 32 into analog.

Here, in the procedure of conversion into decodable bit stream in the MPEG video and audio decoders from transport IC 29, it is decided whether a program selected through communication with access card 22 can be viewed or not. If the bit stream is scrambled, its descrambling is performed with the access card's permission.

During the process of encode/sync/anti-tape/D/A 33 prior to NTSC video output, the analog copy protection waveform is added to prohibit copying to the analog VCR.

IRD 20 employs a CA system for conditional reception so that a subscriber views programs provided through a broadcasting medium such as satellite broadcasting.

In IRD 20, the NDC verifier code, which is software, and access card 22, which is a smart card for CA, are used to support CA function. A descrambler 36 is contained in transport IC 29.

The detailed block diagram of CA unit 37 and transport IC 29 for operating the CA function in a manner generally used in digital broadcasting is shown in FIG. 5.

More specifically, CA unit 37, included in smart card 22, is made up of smart card 38 for CA and microcomputer 39 operated with CA software.

The CA function is performed when the following two kinds of data are transmitted from a broadcasting station to the IRD. In other words, there are two types of data such as entitlement control message (ECM) or control word packet (CWP), and entitlement management message (EMM) or conditional access packet (CAP).

The EMM is accessed, through the telephone line or satellite broadcasting, to the smart card of the respective IRD at the data rate of 200 kbps. The broadcasting station can access all of subscribers' smart cards in a manner that the EMM is transmitted along with ID or address. The EMM has information required to make a control word (CW) for descrambling from the ECM information. The ECM, information in which the control word is encrypted, is transmitted at a speed over 10 per second.

For satellite broadcasting, there are Europe's DVB, Korea's DBS, US' echoster, and the like, aside from DirecTV. Their CA function commonly uses the ECM and EMM information, though different means is provided for the respective broadcastings.

The conventional Macrovision's IPPS is a system having a good performance with respect to the copy protection of analog NTSC video signal. This is an appropriate copyright protection means when a program supplied through a digital medium is converted into analog audio/video signal and recorded or copied through an analog VCR.

However, the IPPS cannot guarantee a satisfactory protection if digital data is recorded or copied using a digital recording medium such as digital VCR. This is because the IPPS uses a method of operating the header's flag bits, without employing, to digital data, encoding methods such as scrambling and encryption. By doing so, hacking is easy to perform only by modulating the flag bits, resulting in very low security.

SUMMARY OF THE INVENTION

Therefore, it is an object of the present invention to provide an illegal view/copy protection method and apparatus for a digital broadcasting system in which intellectual properties supplied via digital media and protected by copyright are prohibited from being illegally recorded or copied using a digital recording medium such as digital VCR by a user.

It is another object of the present invention to provide an illegal view/copy protection method and apparatus for a digital broadcasting system in which data recorded on a cassette tape is always scrambled to make its hacking difficult and protect its copyright.

It is still another object of the present invention to provide an illegal view/copy protection method and apparatus for a digital broadcasting system in which copyright is protected appropriately for respective media which are divided into broadcasting media and pre-recorded media.

It is yet another object of the present invention to provide an illegal view/copy protection method and apparatus for a digital broadcasting system in which intellectual properties supplied from a program provider are reproduced to be viewed on screen, copying of the intellectual properties copied and the number of copy are controlled arbitrarily, and fee for recording and copying is collected for the purpose of copyright protection.

In order to accomplish the objects of the present invention, there is provided an illegal view/copy protection method for a digital broadcasting system comprising: an audio/video signal transmission step for multiplexing and transmitting audio/video bit stream scrambled in control words and information where the control words and CPTC information, for illegal view/copy protection are encrypted; and an audio/video reception step for decrypting the transmitted bit stream to analyze the CPTC information and control words, deciding whether recording is allowed or not to be recorded on cassette tape, and using the control words, performing descrambling and decoding to output audio/video signals to a monitor.

For the objects of the present invention, there is provided an illegal view/copy protection apparatus for a digital broadcasting system comprising: a program producing portion for multiplexing information encrypted both with the control word for scrambling and the CPTC information for prohibiting illegal view/copy, and the audio/video bit stream scrambled in control words, to thereby make a program; a distribution medium portion for distributing programs made in the program producing portion through a transmission medium; and a program receiving portion for detecting and analyzing the CPTC information from the bit stream transmitted from the distribution medium portion and the bit stream reproduced from cassette tape, and descrambling and decoding the bit stream transmitted from the distribution medium portion.

BRIEF DESCRIPTION OF THE ATTACHED DRAWINGS

FIGS. 8A–8D show the recording positions of the CPTC information of the present invention;

FIG. 11 is a flowchart of the CPTC information analyzing step of FIG. 10;

FIG. 12 is a flowchart of showing the reproduction/rerecording step of the illegal view/copy protection method of the present invention;

FIG. 17 is a block diagram of one embodiment of the program receiving portion of FIG. 16;

FIG. 18 is a block diagram of another embodiment of the program receiving portion of FIG. 16;

FIG. 19 is a block diagram of still another embodiment of the program receiving portion of FIG. 16;

FIG. 25 is a block diagram of another embodiment of the smart card of FIG. 17; and FIG. 26 is a block diagram of the DVCR of FIG. 17.

DETAILED DESCRIPTION OF THE INVENTION

An illegal view/copy protection method for a digital broadcasting system of the present invention is performed by audio/video signal transmission and audio/video reception steps.

In the audio/video signal transmission step, audio/video bit stream scrambled in control words and information where the control words and CPTC information for illegal view/copy protection are encrypted are multiplexed and transmitted.

In the audio/video reception step, the bit stream transmitted in the audio/video signal transmission step is decrypted to analyze the CPTC information and control words. By doing so, it is decided whether recording is allowed or not. This result is recorded on cassette tape. Using the control words, descrambling and decoding are performed, and then audio/video signals are output to a monitor. Here, the CPTC information separately manages the ECM, EMM and control words, and contains CA information, to thereby control illegal view/copy protection. The CPTC information will be described with reference to FIGS. 6A and 6B.

Figure 1:
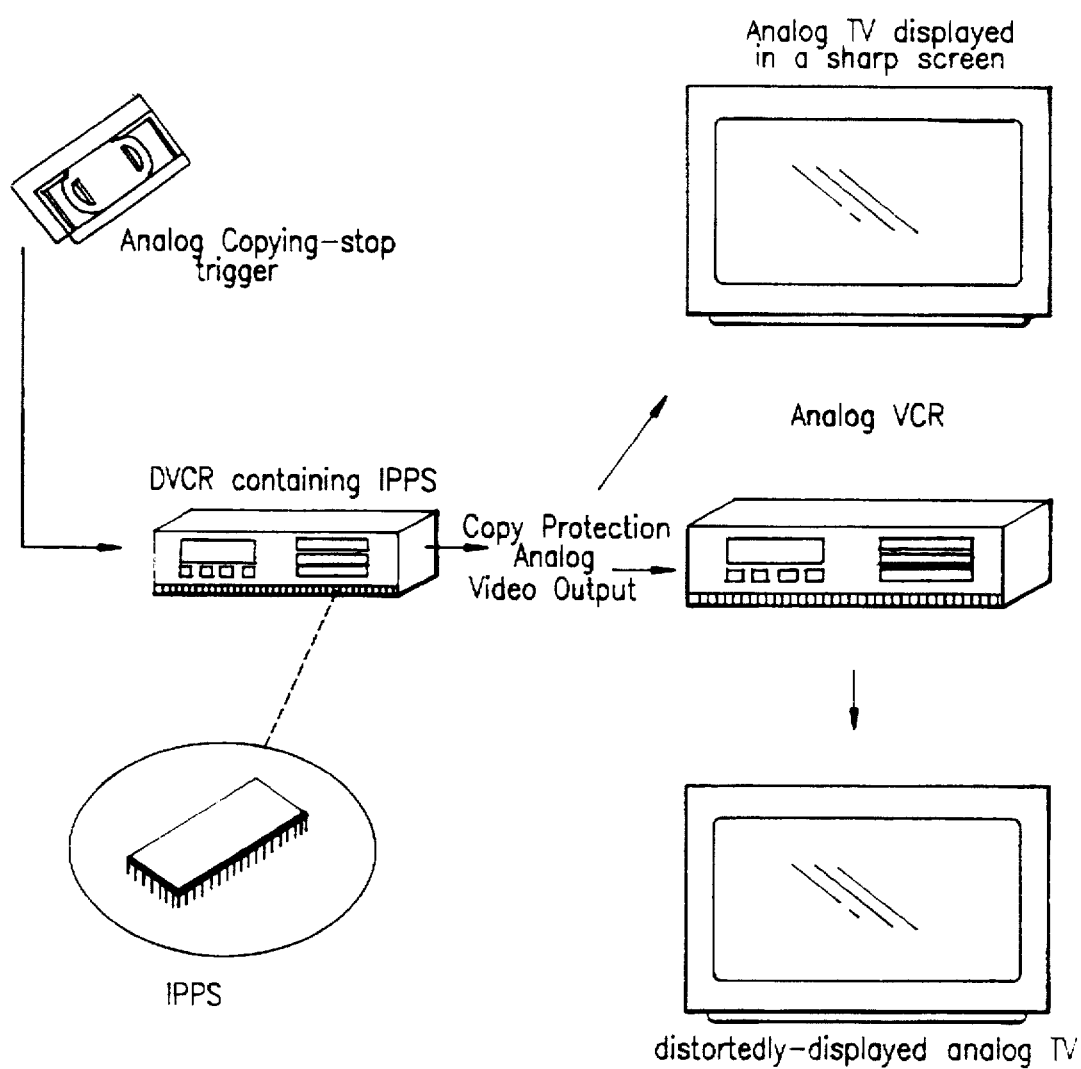
FIGS. 1 and 2 illustrate the operation state of a conventional IPPS.
Figure 2:
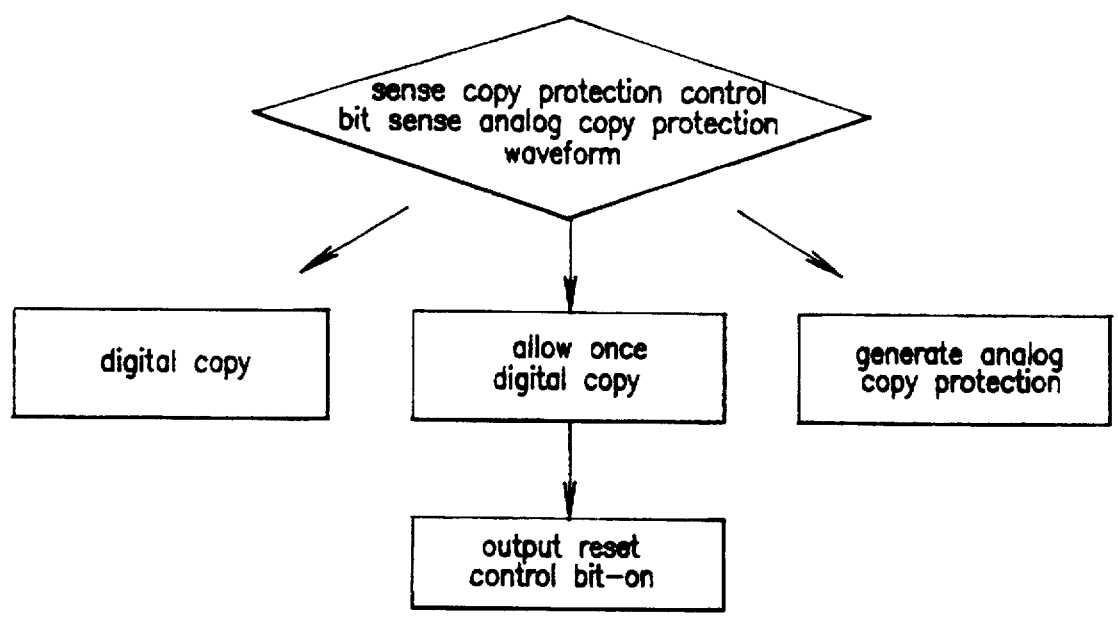
Figure 3:
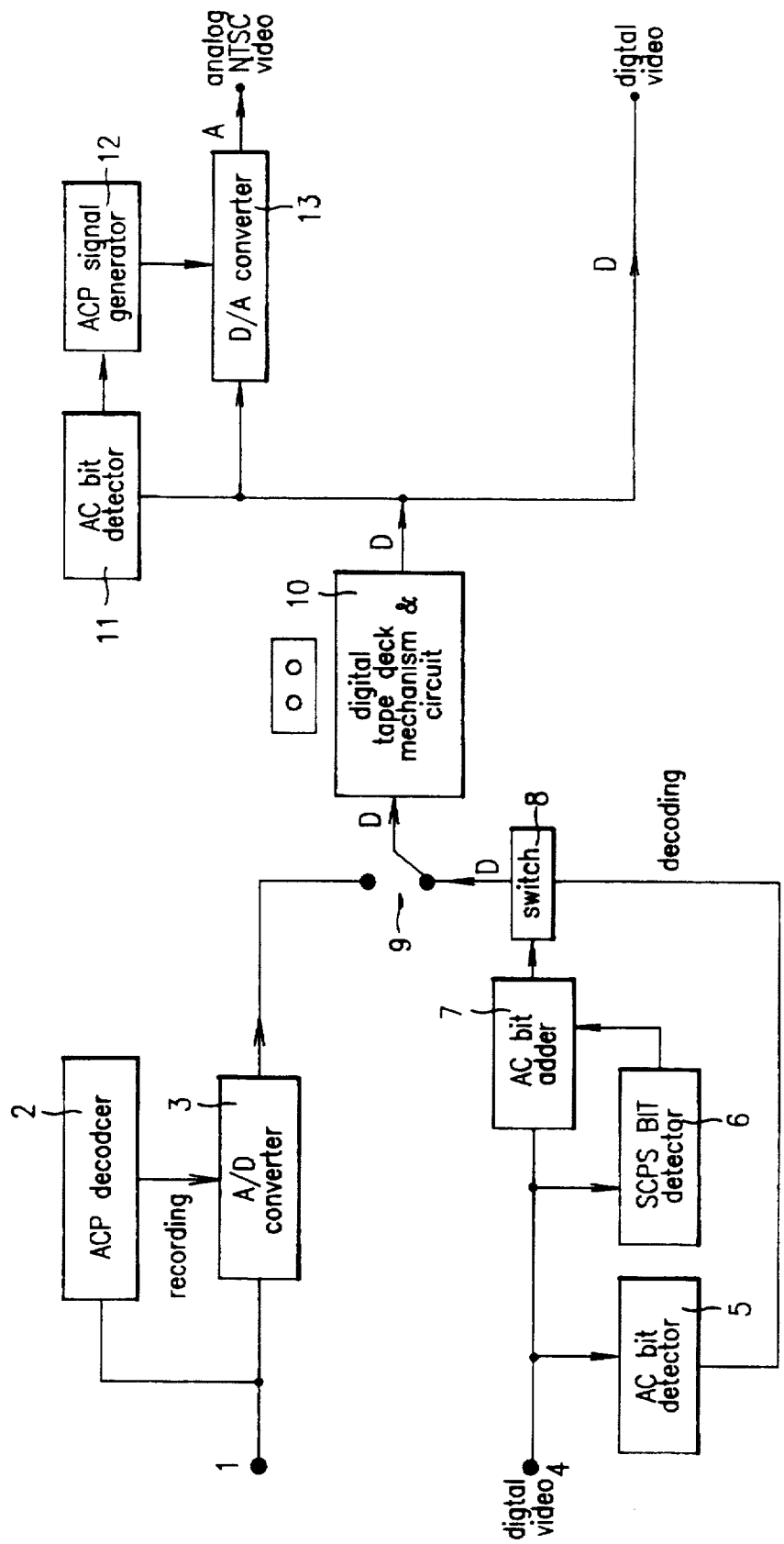
FIG. 3 is a block diagram of a conventional IPPS.
Figure 4:
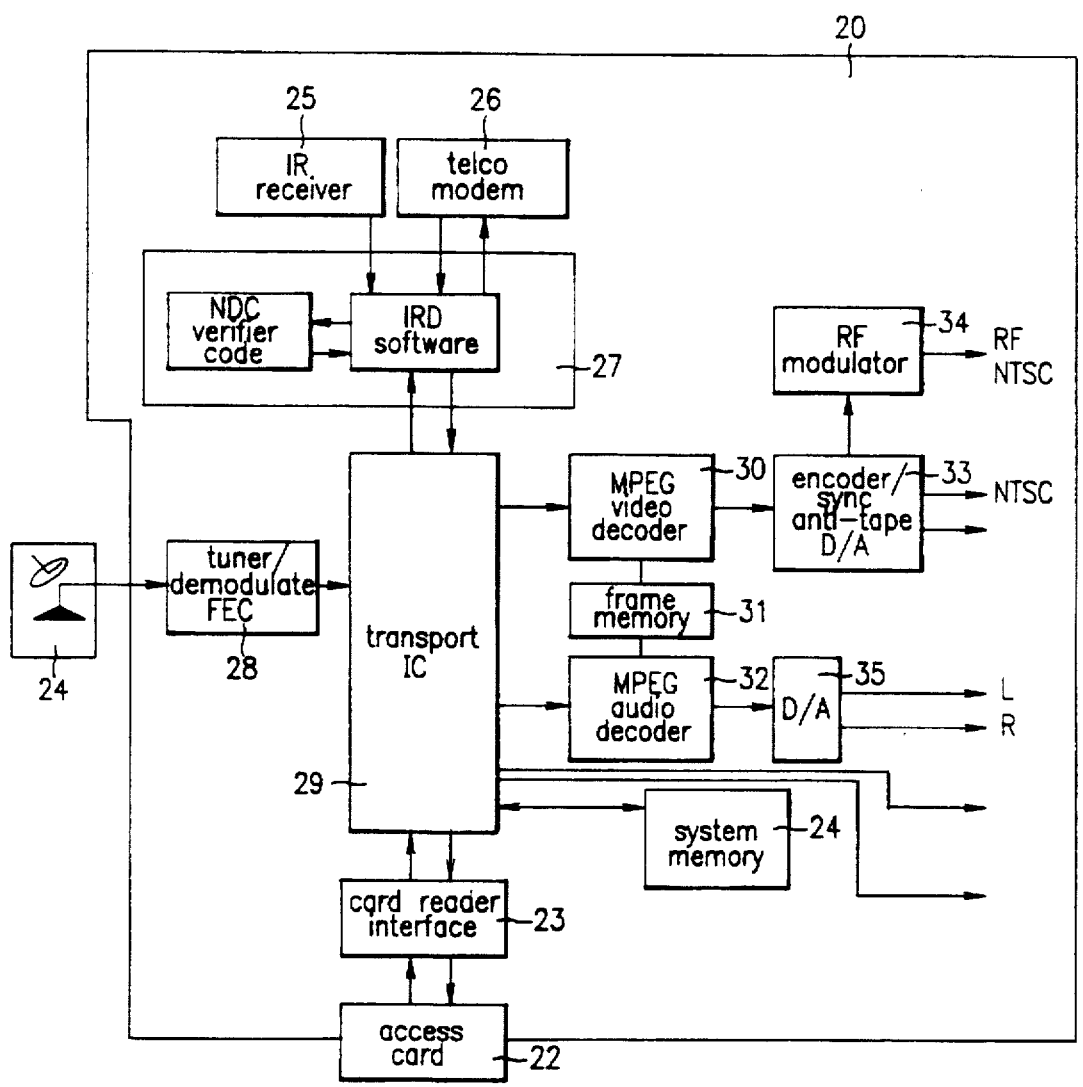
FIG. 4 is a block diagram of an IRD system.
Figure 5:
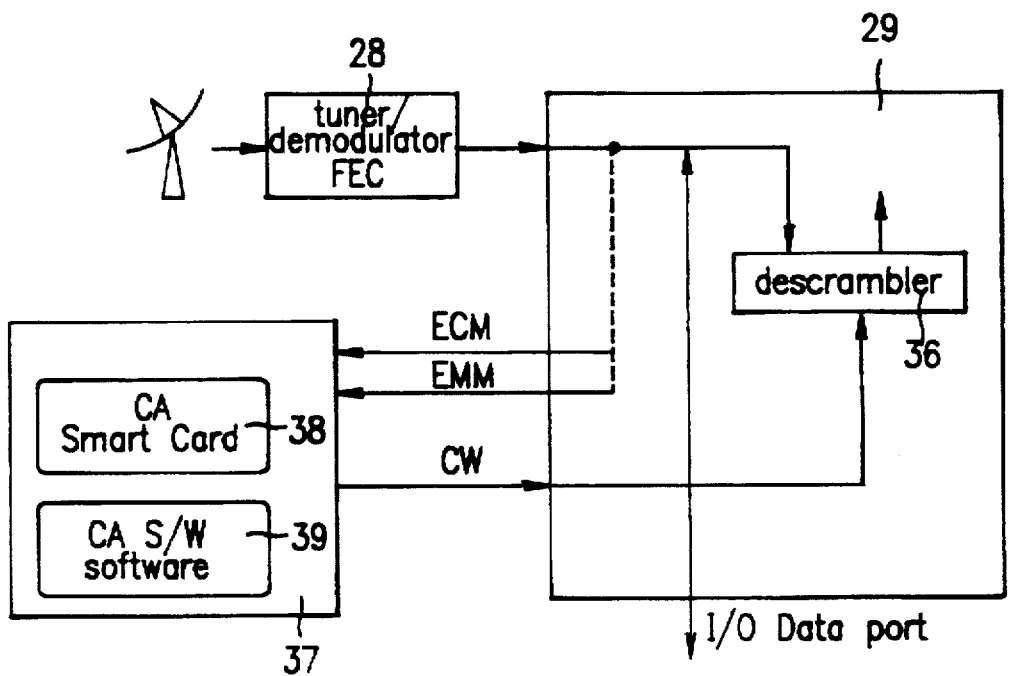
FIG. 5 shows a configuration of general hardware performing CA function.
Figure 6A:
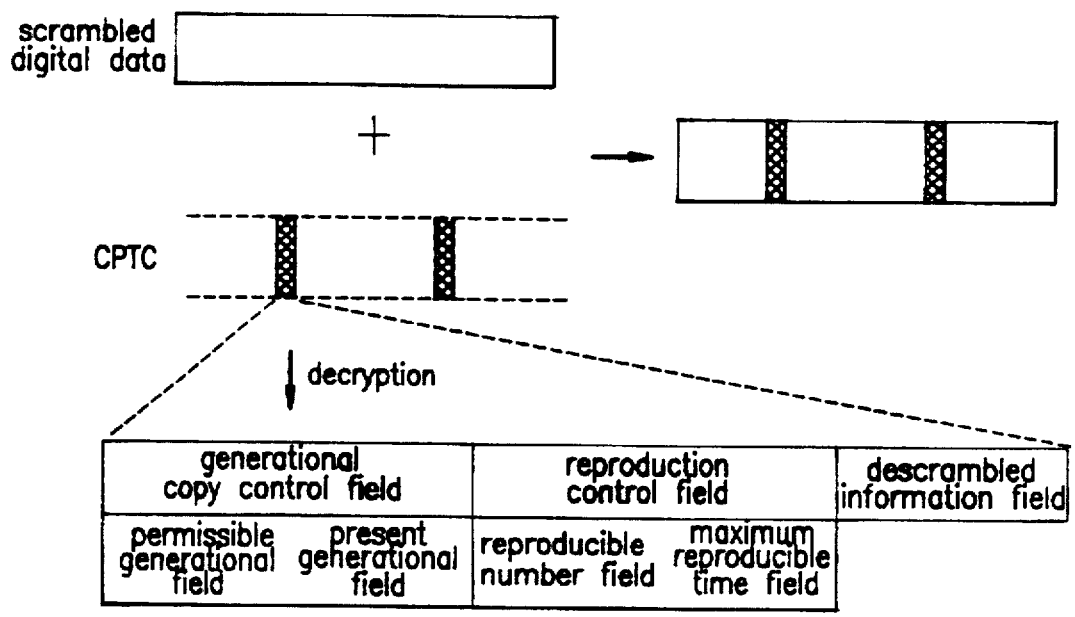
FIGS. 6A and 6B show formats of CPTC information of the present invention.
Figure 6B:
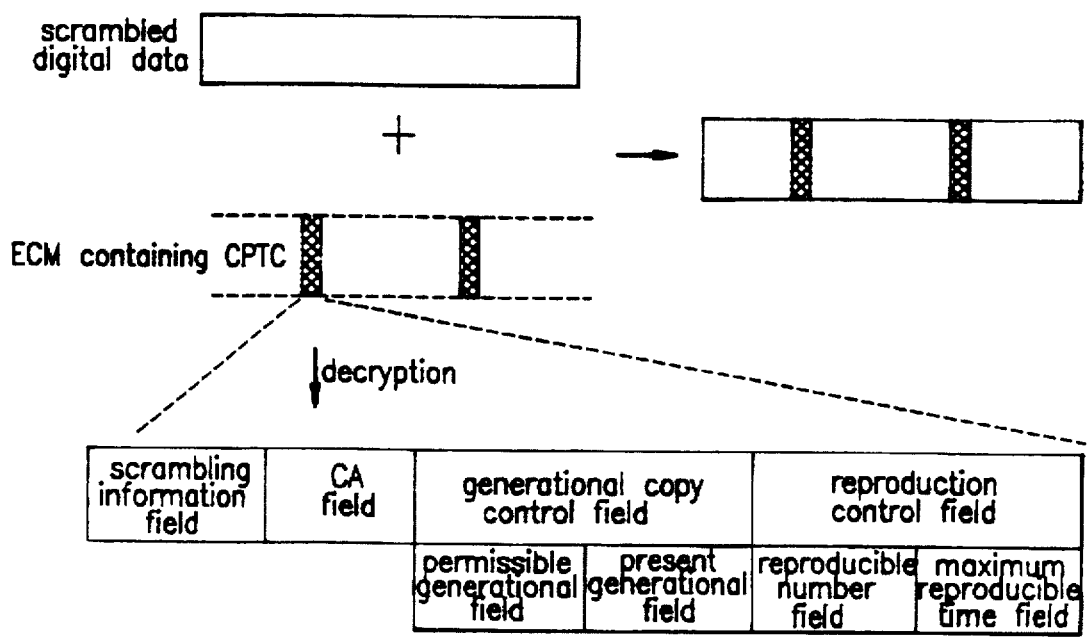

The CPTC information is formatted in a generational copy control field for limiting the number of copy available in order to control the depth of generational copy, and a reproducibility control field for limiting the reproduction of a copied program in order to control the number of copyiable tapes. As shown in FIG. 6A, formatting is performed containing a descrambling information field where part of the control words for descrambling are recorded, or containing a CA field where CA information for conditional access is recorded, as shown in FIG. 6B.

The CPTC information may be encrypted separately to be multiplexed with scrambled digital data, or contained in the ECM information for CA for encryption and multiplexing. Here, the generational copy control field is made up of a permissible generational field for limiting the number of copy permissible and a present generational field for indicating the present generation of a program copied. If the present generation stored in the present generational field is greater than or equal to the permissible generation stored in the permissible generational field, recording or copying is impossible.

A reproduction control field is made up of a reproducible number field for limiting the number of reproducing a copied program, and a maximum reproducible time field for limiting time to reproduce the copied program.

Here, the reproducible number stored in the reproducible number field implements a conditional-number reproducibility function according to the current reproduction number of cassette tape. The maximum reproducible time stored in the maximum reproducible time field implements the conditional-time reproducibility function of copied cassette tape according to the current time information of digital hardware.

The CPTC information may allow the copied cassette tape to be always reproducible, make it never reproducible, allow it to be reproducible as many as a limited number, or make the copied cassette tape reproducible for a limited time after recording or copying.

Using the permissible generational field and present generational field of the generational copy control field, the reproducible number field of the reproduction control field, and data of the maximum reproducible time field, the depth of generation copy, recopying of copied cassette tape, and reproduction time and number are controlled. This process controls the number of copiable cassette tape copied, and reproduction time and number.

Figure 7:
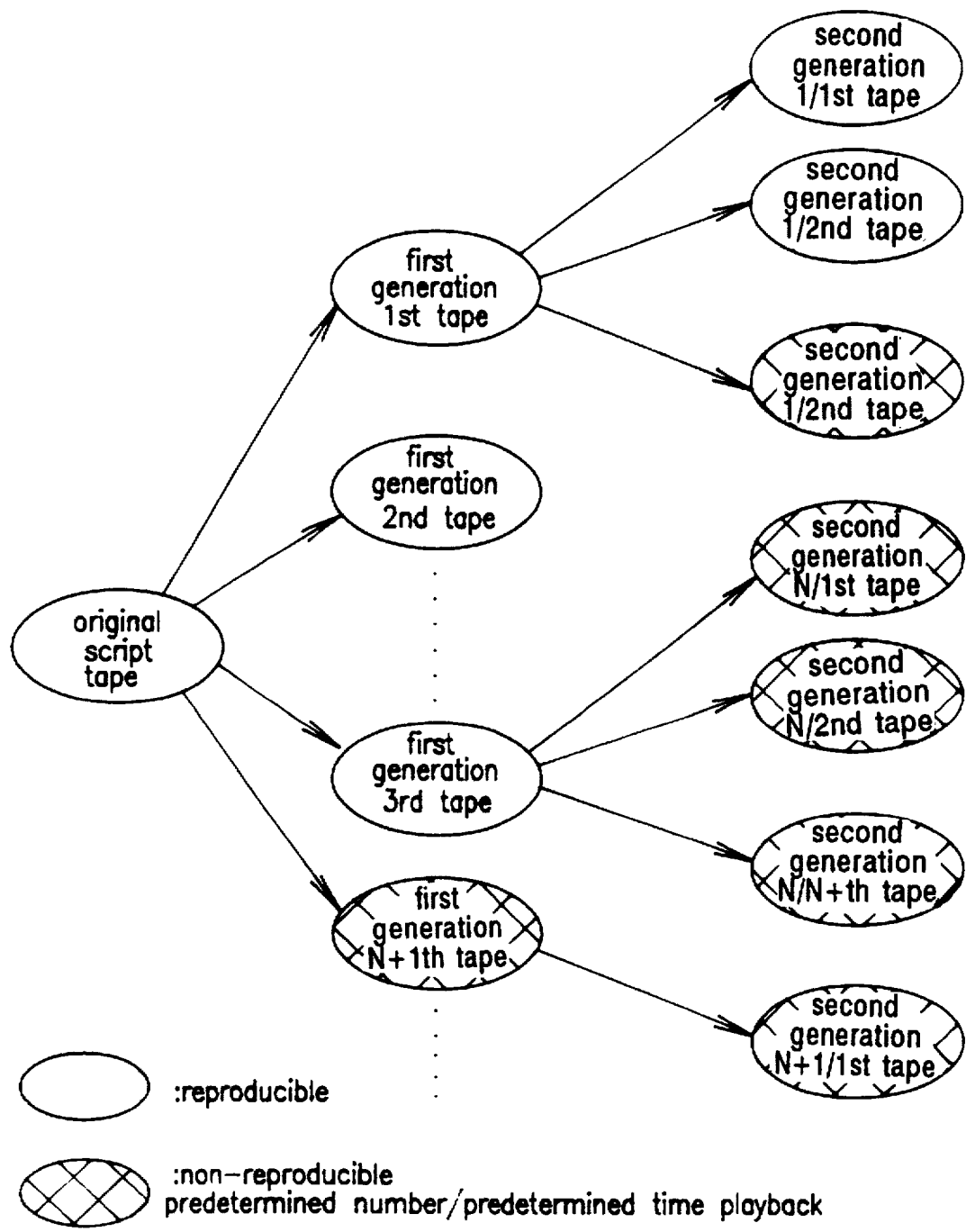
FIG. 7 shows a state of generation copy indicating the number of tape recopiable.

In other words, as shown in FIG. 7, information stored in the permissible generational field and present generational field is used to allow first and second generation copy to be perform. Information stored in the reproducible number field and maximum reproducible time field is used to allow reproduction as many as a limited number or for a limited time.

In order to prohibit illegal recording or copy of a program protected by copyright law, collect fee for recording or copy, or arbitrarily control the number of reproducible copied tape to be made from a program supplied by a provider, the depth of generation copy and reproduction of copy tape are controlled to decide how long the first generation recording and copy and second generation copy are made possible.

For this purpose, the copy tape made to be always reproducible, it is made never to be reproducible, it is made to be reproducible as many as a limited number, or it is made to be reproducible for a limited time after recording or copy.

The data recorded on cassette tape contains scrambled audio/video bit stream and CPTC information. The CPTC information is recorded on a recording medium, that is, a rental tape, to prohibit illegal view/copy.

In other words, as shown in FIG. 8A, the CPTC information is overwritten on the scrambled audio/video bit stream for the error effect and recorded on cassette tape. Otherwise, as shown in FIG. 8B, the CPTC information is recorded on a portion of the audio track of cassette tape, on the control track of cassette tape as shown in FIG. 8C, or on the video track of cassette tape as shown in FIG. 8D.

In other words, as shown in FIG. 8A, the CPTC information is overwritten in a predetermined position in the form of error after parities for error correction, that is, inner and outer parities, are added to the scrambled digital data. This method reduces error correction capability but requires no additional tape area for recording the CPTC information. Further, during interleaving and decoding of ECC, the CPTC information is recognized as an error and removed, obtaining the scrambled digital data. Here, the CPTC information is detected separately.

In case that the CPTC information is recorded in part of audio track or control track, as shown in FIGS. 8B and 8C, the audio head or control head must be additionally used as the means for detecting the CPTC so that audio track and control track are additionally accessed to detect the CPTC information.

The audio/video signal transmission step using the CPTC information will be explained with reference to FIG. 9.

One embodiment of the audio/video signal transmission step is to transmit an audio/video signal not containing the CA information for conditional access. This, having only the copy protection function, is used in case that a program which can be provided to all viewers is transmitted.

Figure 9:
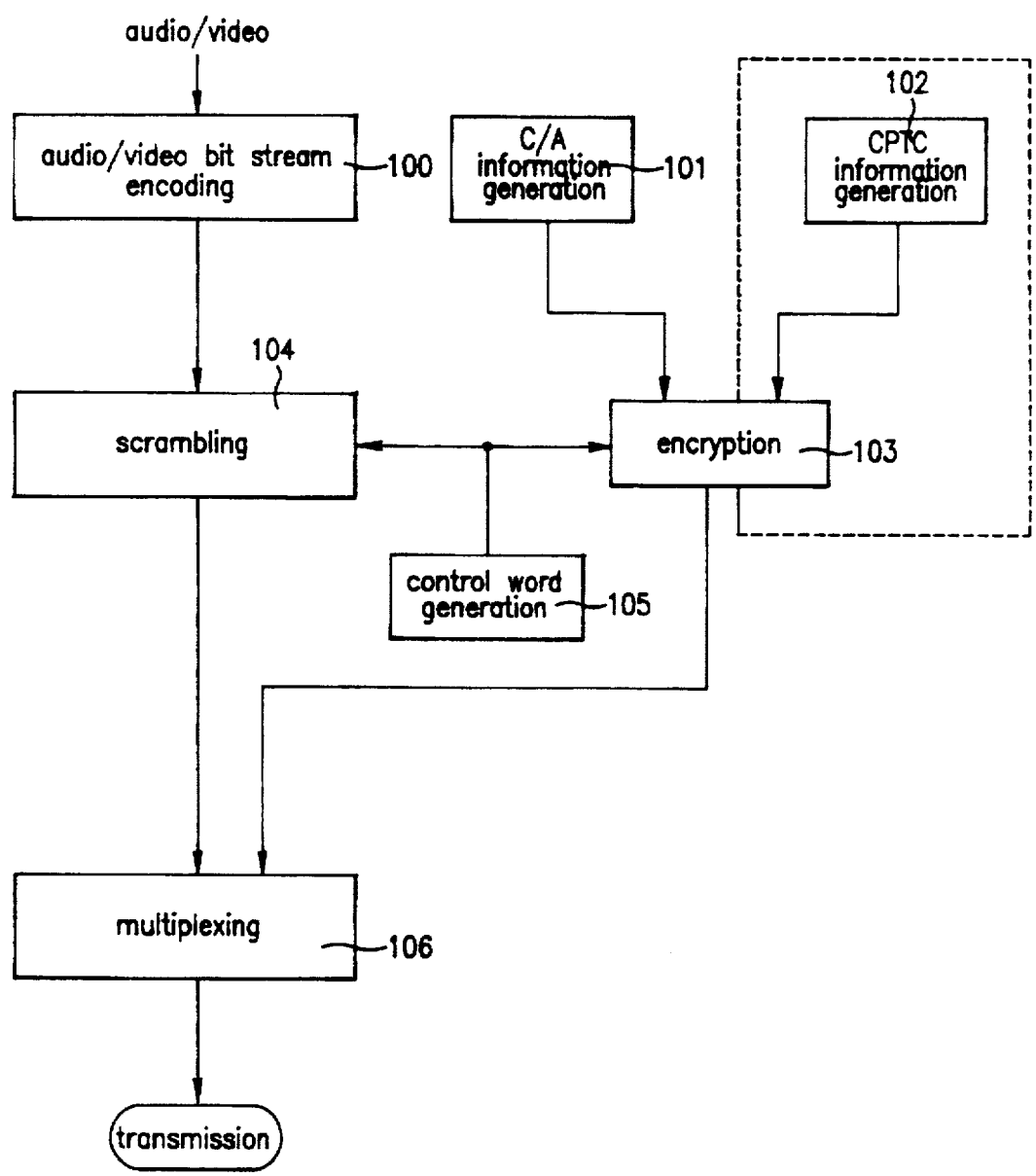
FIG. 9 is a flowchart of showing the transmission step of the illegal view/copy protection method of the present invention.

As shown in FIG. 9, the first embodiment of the audio/video signal transmission step comprises the steps of: encoding (100) the audio/video bit stream; generating (105) a control word for scrambling; scrambling (104) for the encoded audio/video bit stream using the generated control word; generating (102) CPTC information for illegal view/copy protection; encrypting (103) for encrypting the control word and CPTC information; and multiplexing and transmitting (106) the scrambled audio/video bit stream and encrypted CPTC information.

In other words, in step 100, the audio/video bit stream is encoded. In step 105, the control word for scrambling is generated. In step 104, the encoded audio/video bit stream is scrambled using the generated control word. In step 102, the CPTC information for illegal view/copy protection is generated. In step 103, the CPTC information and CA information are encrypted using the generated control word. The scrambled audio/video bit stream, encrypted CPTC information and CA information are multiplexed and transmitted through a transmission medium in step 106. The audio/video signal transmitted through the first embodiment of the audio/video signal transmission step is received through one embodiment of an audio/video reception step.

Figure 10:
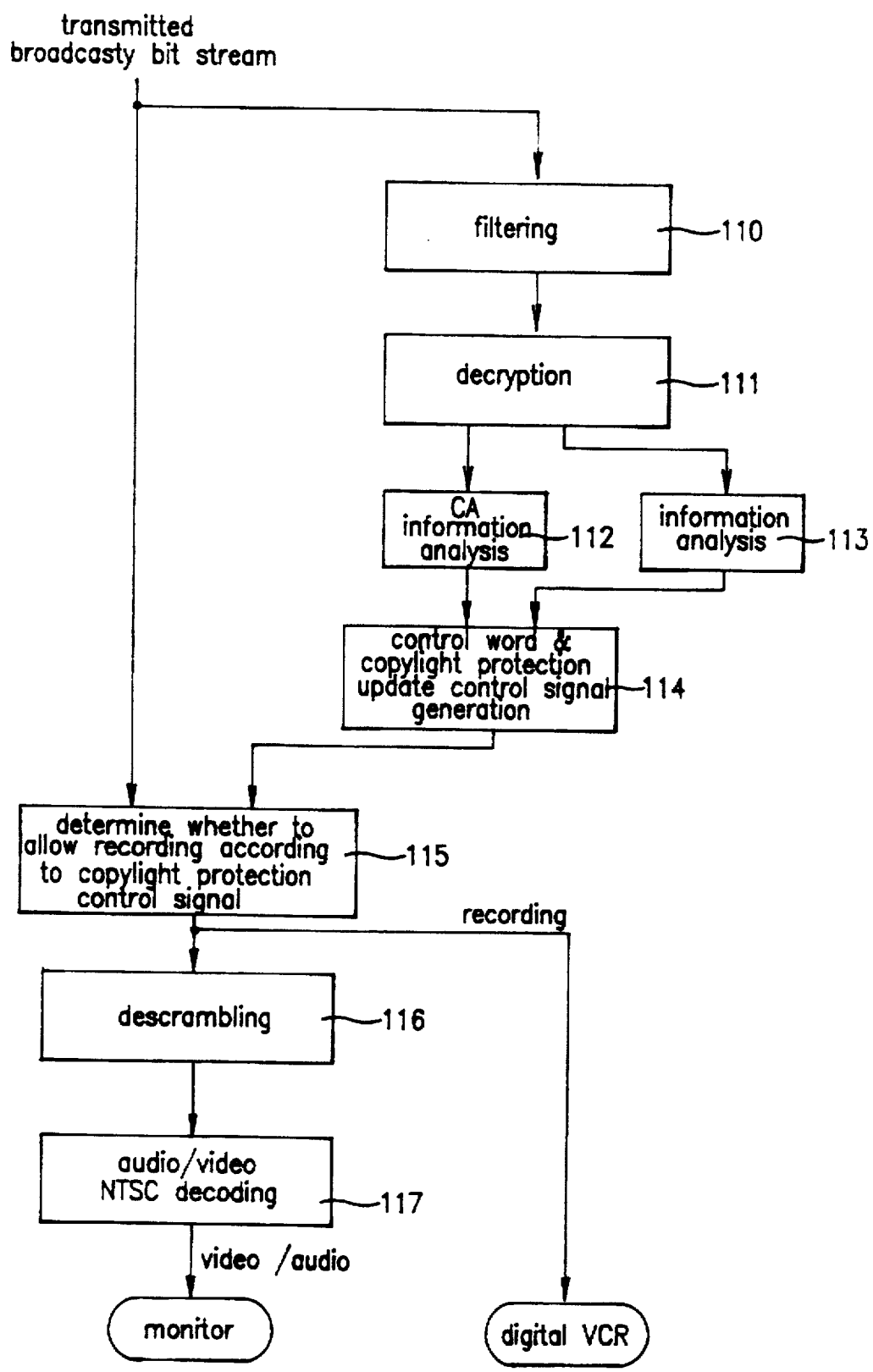
FIG. 10 is a flowchart of showing the reception step of the illegal view/copy protection method of the present invention.

Referring to FIG. 10, the first embodiment of the audio/video reception step comprises the steps of filtering (110) the transmitted bit stream and decrypting (111) the CPTC information; analyzing (113 and 114) the CPTC information to generate a control word and a signal for controlling the protection of copyright and to update the CPTC information; deciding (115) whether to allow recording according to the signal for controlling the protection of copyright to record the scrambled and transmitted bit stream on cassette tape; and descrambling and decoding (116 and 117) the transmitted bit stream in the control word and outputting an audio/video signal.

In other words, the bit stream transmitted in the first embodiment of the audio/video signal transmission step is filtered and the CPTC information is decrypted in steps 110 and 111. The CPTC information is analyzed to generate the control word and the signal for controlling the protection of copyright, and the CPTC information is updated in steps 113 and 114. Whether to allow recording is determined by the generated signal for controlling the protection of copyright so that the scrambled and transmitted bit stream is recorded on cassette tape in step 115. Then, the transmitted bit stream is descrambled and decoded in control words and output as an audio/video signal in steps 116 and 117. Here, all of the control word is contained in the CPTC information.

Referring to FIG. 11, the CPTC information analyzing step comprises-the steps of detecting (130, 131, 132 and 133) the permissible generation of the permissible generational field for limiting the available number of copy of a program of the CPTC information and the present generation of the present generational field indicating the present generation of the program copied, to thereby perform copy-impossible and update the CPTC information; and detecting (134, 135, 136 and 137) the reproducible number of the reproducible number field for limiting the number of reproduction of copied programs of the CPTC information, the maximum reproducible time of the maximum reproducible time field for limiting time to reproduce the copied program, and the number and time of reproduction of tape, to thereby process reproduction-impossible.

The copying number limiting step comprises the steps of: comparing (130) the permissible generation of the permissible generational field and the present generation of the present generational field and deciding whether the permissible generation is below the present generation; if the permissible generation is below the present generation, generating (131) an output disable signal to make copying impossible and destroying the control word; and if the permissible generation is not below the present generation, increasing (132) the present invention by '1' and recording the result on cassette tape. If the permissible generation is not below the present generation, the CPTC information is updated in step 133, instead of increasing the present generation by '1.'

In order to control generation copy, the permissible generation of the permissible generational field and the present generation of the present generational field are compared in step 130. If the permissible generation is below the present generation, the output disable signal is generated to make copying impossible and the control word is destroyed in step 131. If the permissible generation is not below the present generation, the present generation is increased by '1' and thus recorded on cassette tape in step 132. This enables generation copy. Here, it can be possible that generation copy is limited by updating the CPTC information, instead of increasing the present generation by '1.'

The reproduction limiting step comprises the steps of: comparing the reproducible number of the reproducible number field and the reproduction number of tape and deciding (134) whether the reproducible number is below the reproduction number of tape; if the reproducible number is not below the reproduction number of tape, comparing the maximum reproducible time and reproduction time of tape, and deciding (135) whether the maximum reproducible time is below the reproduction time of tape; if the maximum reproducible time is not below reproduction time of tape, turning off (136) an enable erase signal to thereby enable the copied program to be reproduced; if the reproducible number is below the reproduction number of tape or the maximum reproducible time is below the reproduction time of tape, turning on (137) the enable erase signal to make the reproduction of the copied program impossible so that part of or the whole program recorded on cassette tape is erased.

In order to control reproduction, the reproducible number of the reproducible number field and the reproduction number of tape are compared in step 134. If the reproducible number is not below the reproduction number of tape, the maximum reproducible time of the maximum reproducible time field and the reproduction time of tape are compared and it is decided whether the maximum reproducible time is below the reproduction time of tape in step 135. In other words, though reproducible, whether it is limited by the reproducible time must be checked. If the maximum reproducible time is not below the reproduction time of tape, the enable erase signal is turned off in step 136 to thereby make the copied program reproducible. If the reproducible number is below the reproduction number of tape or the maximum reproducible time is below the reproduction time of tape, the enable erase signal is turned on to prohibit the reproduction of the copied program. By doing so, part of or the whole program recorded on cassette tape is erased to make copy and reproduction impossible in step 137.

Here, the current time is transmitted to the user by a provider along with a program. In this case, the copyright protection system implements limited time reproduction using transmitted time information. In this method, the program provider manages the whole users' time so that time modulation by a user cannot occur. Therefore, this is very secure.

The bit stream transmitted in the first embodiment of the audio/video signal transmission step contains ECM and EMM. Part of the control word may be contained in the CPTC information. Its remainder may be contained in the ECM or EMM. The whole control word is contained in the ECM or EMM.

The audio/video signal containing the control word and transmitted according to the audio/video signal transmission step is received according to another embodiment of the audio/video reception step.

Referring to FIG. 10, the second embodiment of the audio/video reception step comprises the steps of filtering (110) the transmitted bit stream and decrypting (111) the CPTC information and control word; filtering (118) the control word; analyzing (113 and 114) the CPTC information to generate a control word and a signal for controlling the protection of copyright and to update the CPTC information; deciding (115) whether to allow recording according to the signal for controlling the protection of copyright to record the scrambled and transmitted bit stream on cassette tape; and descrambling and decoding (116 and 117) the transmitted bit stream in control words and outputting an audio/video signal.

In other words, the bit stream transmitted in the audio/video signal transmission step is filtered and the CPTC information and control word are decrypted in steps 110 and ill. The control word is filtered in step 118. The decrypted CPTC information is analyzed to generate the control word and the signal for controlling the protection of copyright, and the CPTC information is updated in steps 113 and 114. Whether to allow recording is determined by the generated signal for controlling the protection of copyright so that the scrambled and transmitted bit stream is recorded on cassette tape in step 115. Then, the transmitted bit stream is descrambled and decoded in control words and output as an audio/video signal in steps 116 and 117.

Referring to FIG. 11, in the same manner as the first embodiment of the audio/video reception step, the CPTC information analyzing step comprises the steps of: generating the control words; detecting (130, 131, 132 and 133) the permissible generation of the permissible generational field for limiting the available number of copy of a program of the CPTC information and the present generation of the present generational field indicating the present generation of the program copied, to thereby perform copy-impossible and update the CPTC information; and detecting (134, 135, 136 and 137) the reproducible number of the reproducible number field for limiting the number of reproduction of copied programs of the CPTC information, the maximum reproducible time of the maximum reproducible time field for limiting time to reproduce the copied program, and the number and time of reproduction of tape, to thereby process reproduction-impossible.

The copying number limiting step comprises the steps of: comparing (130) the permissible generation of the permissible generational field and the present generation of the present generational field and deciding whether the permissible generation is below the present generation; if the permissible generation is below the present generation, generating (131) an output disable signal to make copying impossible and destroying the control word; and if the permissible generation is not below the present generation, increasing (132) the present invention by '1' and recording the result on cassette tape. If the permissible generation is not below the present generation, the CPTC information is updated in step 133, instead of increasing the present generation by '1.'

The reproduction limiting step comprises the steps of: comparing the reproducible number of the reproducible number field and the reproduction number of tape and deciding (134) whether the reproducible number is below the reproduction number of tape; if the reproducible number is not below the reproduction number of tape, comparing the maximum reproducible time and reproduction time of tape, and deciding (135) whether the maximum reproducible time is below the reproduction time of tape; if the maximum reproducible time is not below reproduction time of tape, turning off (136) an enable erase signal to thereby enable the copied program to be reproduced; if the reproducible number is below the reproduction number of tape or the maximum reproducible time is below the reproduction time of tape, turning on (137) the enable erase signal to make the reproduction of the copied program impossible so that part of or the whole program recorded on cassette tape is erased.

Another embodiment of the audio/video signal transmission step is to transmit an audio/video signal containing the CA information for conditional access. This, having the illegal reception and copy protection functions, is used in case that a program which can be provided to limited viewers is transmitted.

As shown in FIG. 9, the second embodiment of the audio/video signal transmission step comprises the steps of: encoding (100) the audio/video bit stream; generating (105) a control word for scrambling; scrambling (104) for the encoded audio/video bit stream using the generated control word; generating (102) CPTC information for illegal view/copy protection; generating (101) CA information for conditional reception; encrypting (103) for encrypting the CPTC information and CA information; and multiplexing and transmitting (106) the scrambled audio/video bit stream and encrypted CPTC information and CA information.

In other words, in step 100, the audio/video bit stream is encoded. In step 105, the control word for scrambling is generated. In step 104, the encoded audio/video bit stream is scrambled using the generated control word. In step 102, the CPTC information for illegal view/copy protection is generated. In step 101, CA information for conditional reception is generated. In step 103, the CPTC information and CA information are encrypted using the generated control word. The scrambled audio/video bit stream, encrypted CPTC information and CA information are multiplexed and transmitted through a transmission medium in step 106. The audio/video signal transmitted through the second embodiment of the audio/video signal transmission step is received through the second embodiment of the audio/video reception step.

Referring to FIG. 10, the second embodiment of the audio/video reception step comprises the steps of: filtering (110) the transmitted bit stream and decrypting (111) the CPTC information; analyzing (112, 113 and 114) the CPTC information and CA information to generate a control word and a signal for controlling the protection of copyright and to update the CPTC information; deciding (115) whether to allow recording according to the signal for controlling the protection of copyright to record the scrambled and transmitted bit stream on cassette tape; and descrambling and decoding (116 and 117) the transmitted bit stream and outputting an audio/video signal.

Referring to FIG. 11, in the same manner as the first embodiment of the audio/video reception step, the CPTC information analyzing step comprises the steps of: generating a control word; detecting (130, 131, 132 and 133) the permissible generation of the permissible generational field for limiting the available number of copy of a program of the CPTC information and the present generation of the present generational field indicating the present generation of the program copied, to thereby perform copy-impossible and update the CPTC information; and detecting (134, 135, 136 and 137) the reproducible number of the reproducible number field for limiting the number of reproduction of copied programs of the CPTC information, the maximum reproducible time of the maximum reproducible time field for limiting time to reproduce the copied program, and the number and time of reproduction of tape, to thereby process reproduction-impossible.

In the same manner as the first embodiment of the audio/video reception step, the copying number limiting step comprises the steps of: comparing (130) the permissible generation of the permissible generational field and the present generation of the present generational field and deciding whether the permissible generation is below the present generation; if the permissible generation is below the present generation, generating (131) an output disable signal to make copying impossible and destroying the control word; and if the permissible generation is not below the present generation, increasing (132) the present invention by '1' and recording the result on cassette tape. If the permissible generation is not below the present generation, the CPTC information is updated in step 133.

The reproduction limiting step comprises the steps of: comparing the reproducible number of the reproducible number field and the reproduction number of tape and deciding (134) whether the reproducible number is below the reproduction number of tape; if the reproducible number is not below the reproduction number of tape, comparing the maximum reproducible time and reproduction time of tape, and deciding (135) whether the maximum reproducible time is below the reproduction time of tape; if the maximum-reproducible time is not below reproduction time of tape, turning off (136) an enable erase signal to thereby enable the copied program to be reproduced; if the reproducible number is below the reproduction number of tape or the maximum reproducible time is below the reproduction time of tape, turning on (137) the enable erase signal to make the reproduction of the copied program impossible so that part of or the whole program recorded on cassette tape is erased.

The bit stream transmitted in the second embodiment of the audio/video signal transmission step contains ECM and EMM. Part of the control word may be contained in the CPTC information. Its remainder may be contained in the ECM or EMM. The whole control word is contained in the ECM or EMM.

The audio/video signal containing the control word and transmitted according to the audio/video signal transmission step is received according to another embodiment of the audio/video reception step. The audio/video signal transmitted in the audio/video signal transmission step containing the control word is received according to still another embodiment of the audio/video reception step.

Referring to FIG. 10, the third embodiment of the audio/video reception step comprises the steps of: filtering (110) the transmitted bit stream and decrypting (111) the CPTC information and CA information; analyzing (112, 113, 114 and 118) the CPTC information and CA information and filtering the control word to generate a control word and a signal for controlling the protection of copyright and to update the CPTC information; deciding (115) whether to allow recording according to the signal for controlling the protection of copyright to record the scrambled and transmitted bit stream on cassette tape; and descrambling and decoding (116 and 117) the transmitted bit stream and outputting an audio/video signal.

Referring to FIG. 11, in the same manner as the first embodiment of the audio/video reception step, the CPTC information analyzing step comprises the steps of: generating the control words; detecting (130, 131, 132 and 133) the permissible generation of the permissible generational field for limiting the available number of copy of a program of the CPTC information and the present generation of the present generational field indicating the present generation of the program copied, to thereby perform copy-impossible and update the CPTC information; and detecting (134, 135, 136 and 137) the reproducible number of the reproducible number field for limiting the number of reproduction of copied programs of the CPTC information, the maximum reproducible time of the maximum reproducible time field for limiting time to reproduce the copied program, and the number and time of reproduction of tape, to thereby process reproduction-impossible.

The copying number limiting step comprises the steps of: comparing (130) the permissible generation of the permissible generational field and the present generation of the present generational field and deciding whether the permissible generation is below the present generation; if the permissible generation is below the present generation, generating (131) an output disable signal to make copying impossible and destroying the control word; and if the permissible generation is not below the present generation, increasing (132) the present invention by '1' and recording the result on cassette tape, and if the permissible generation is not below the present generation, updating the CPTC information in step 133.

The reproduction limiting step comprises the steps of: comparing the reproducible number of the reproducible number field and the reproduction number of tape and deciding (134) whether the reproducible number is below the reproduction number of tape; if the reproducible number is not below the reproduction number of tape, comparing the maximum reproducible time and reproduction time of tape, and deciding (135) whether the maximum reproducible time is below the reproduction time of tape; if the maximum reproducible time is not below reproduction time of tape, turning off (136) an enable erase signal to thereby enable the copied program to be reproduced; if the reproducible number is below the reproduction number of tape or the maximum reproducible time is below the reproduction time of tape, turning on (137) the enable erase signal to make the reproduction of the copied program impossible so that part of or the whole program recorded on cassette tape is erased.

The illegal view/copy protection method for digital broadcasting system of the present invention, after the audio/video signal transmission step and audio/video reception step, further comprises a reproduction and rerecording step of: decrypting the bit stream recorded and reproduced on cassette tape, analyzing the CPTC information, deciding whether to allow rerecording, recording the result on cassette tape, filtering the control word, and performing descrambling and decoding to output an audio/video signal.

Referring to FIG. 12, the audio/video reproduction and rerecording step comprises the steps of: filtering (120) the bit stream recorded and reproduced on video tape, and decrypting (121) the CPTC information; analyzing (122 and 123) the CPTC information to generate control words and a signal for controlling the protection of copyright and update the CPTC information; deciding (124) whether to allow recording according to the signal of controlling the protection of copyright, and recording the scrambled and transmitted bit stream on cassette tape; descrambling and decoding (125 and 126) the transmitted bit stream in control words to output an audio/video signal; and deciding whether to allow post-reproduction according to the signal for controlling the protection of copyright to thereby erase part of or the whole data recorded on cassette tape.

Here, EMM may contain information required for decoding information in order to perform the illegal view/copy protection method of a broadcasting system. In this case, a step of storing and processing the EMM is added in the audio/video reproduction and rerecording step.

In the EMM storing and processing step, in case that the EMM is updated by a broadcasting station for the purpose of copyright protection, the EMM having information required to decode the CPTC information is stored in order to continuously reproduce programs of copied cassette tape.

Here, an ID number indicative of updating the EMM is recorded on cassette tape. The EMM is stored to which the updating state and the ID number of cassette tape are mapped.

The EMM storing and processing step comprises the steps of: storing all EMM to be updated and corresponding ID information; selecting the latest EMM in recording cassette tape; recording a corresponding ID number; and selecting an EMM corresponding to the ID number recorded on cassette tape in reproducing the cassette tape.

Figures 13, 14, 15:
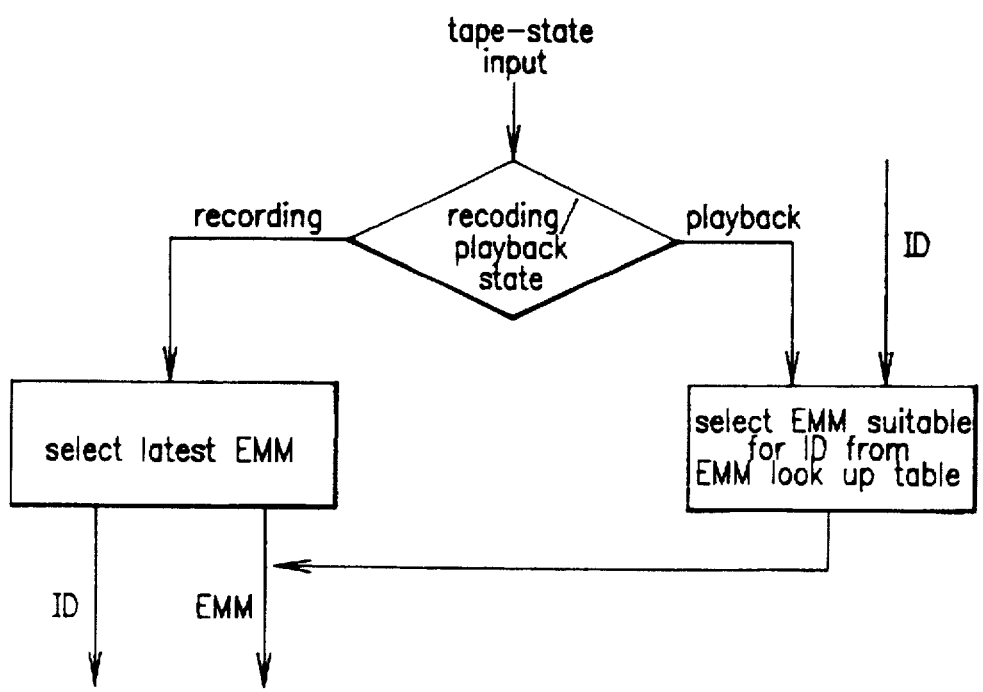
FIG. 13 shows the format of an EMM lookup table.
FIG. 14 shows the format of a tape state signal.
FIG. 15 is a flowchart of showing the EMM processing step.

As shown in FIG. 13, all EMMs (EMM1, EMM2, EMM3, . . . ) to be updated on the EMM lookup table and corresponding ID information (ID1, ID2, ID3, . . . ) are mapped and stored.

Referring to FIGS. 14 and 15, in recording a program on cassette tape, that is, when recording is indicated in the recording/reproduction mode, an ID number corresponding to the latest, the final, EMM, is recorded. Thereafter, in reproducing the cassette tape, that is, when reproduction is indicated in the recording/reproduction mode, an EMM corresponding to the ID number recorded on cassette tape is selected from the EMM lookup table so that the recorded program is reproduced according to the reproducible number of the reproducible number field and the reproduction number recorded on the video tape.

Figure 16:
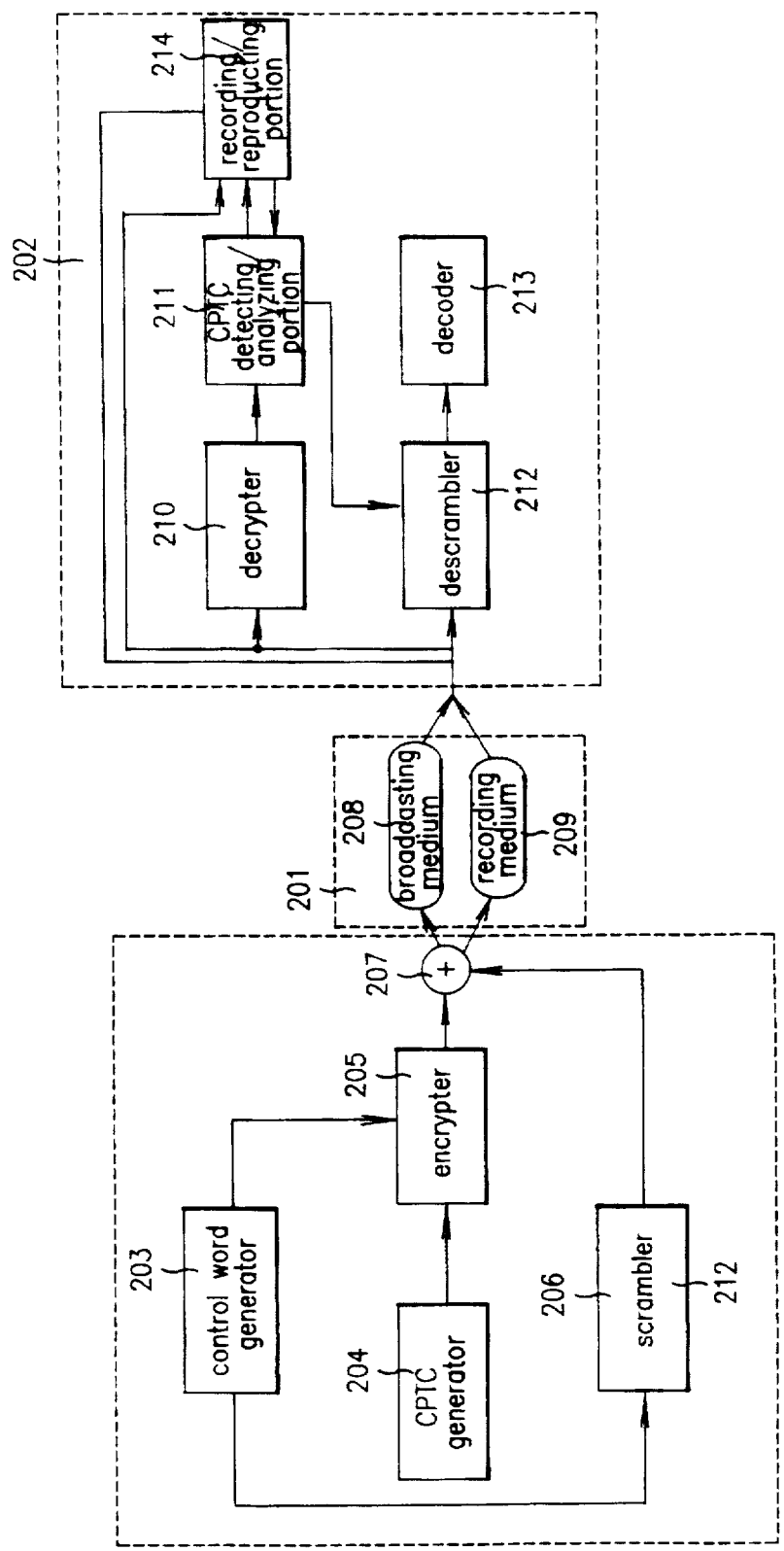
FIG. 16 is a block diagram of the whole configuration of the illegal view/copy protection apparatus of the present invention.

Referring to FIG. 16, an illegal view/copy protection apparatus of digital broadcasting system of the present invention comprises a program producing portion 200, distribution medium portion 201, and program receiving portion 202.

Program producing portion 200 offers programs, in which information encrypted both with the control word for scrambling and the CPTC information for prohibiting illegal view/copy, and the audio/video bit stream scrambled in control words are multiplexed to make a program.

Distribution medium portion 201 distributes programs made in program producing portion 200 through a transmission medium.

Program receiving portion 202 detects and analyzes the CPTC information from the bit stream transmitted from distribution medium portion 201 and the bit stream reproduced from cassette tape, and descrambles and decodes the bit stream transmitted from distribution medium portion 201. The descrambled and decoded bit stream is displayed or recorded on cassette tape.

Program producing portion 200 comprises a control word generator 203 for generating a control word for scrambling, a CPTC generator 204 for generating the CPTC information for prohibiting illegal view/copy, a scrambling portion 206 for scrambling the audio/video bit stream using the control word output from control word generator 203, an encrypting portion 205 for encrypting the control word output from control word generator 203 and the CPTC information output from CPTC generator 204, and an adder 207 for multiplexing the signals output from scrambling portion 206 and encrypting portion 205 and transmitting them to distribution medium portion 201.

Distribution medium portion 201 comprises a broadcasting medium 208 for distributing the program made by program producing portion 200 through cable, satellite or terrestrial broadcasting, and a recording medium 209 for distributing the program made by program producing portion 200 through cassette tape.

Program receiving portion 202 comprises a decrypting portion 210 for decrypting the bit stream transmitted from broadcasting medium 208, a CPTC detecting/analyzing portion 211 for detecting and analyzing the CPTC information from the bit stream output from decrypting portion 210 and recording medium 209, and outputting signals for controlling the control word and illegal view/copy, a descrambling portion 212 for descrambling the bit stream transmitted from broadcasting medium 208 and recording medium 209 and the bit stream reproduced from cassette tape, a decoding portion 213 for decoding and displaying the signal output from descrambling portion 212, and a recording/reproducing portion 214 for recording the bit stream transmitted from broadcasting medium 208 and recording medium 209 according to the signal output from CPTC detecting/analyzing portion 211, and reproducing cassette tape, to thereby output the result to descrambling portion 212 and CPTC detecting/analyzing portion 211.

The operation of illegal view/copy protection apparatus for a digital broadcasting system of the present invention will be described below.

Control word generator 203 generates a control word for scrambling, and CPTC generator 204 generates the CPTC information f or prohibiting illegal view/copy. Scrambling portion 206 scrambles the audio/video bit stream using the generated control word. Encrypting portion 205 encrypts the CPTC information output from CPTC generator 204 using the generated control word. The audio/video bit stream scrambled in scrambling portion 206 is multiplexed with the encrypted CPTC information in adder 207. The multiplexed result is transmitted to a reception port through distribution medium portion 201.

The signal output from adder 207 is transmitted to program receiving portion 202 through broadcasting medium 208 such as cable, satellite, and terrestrial broadcastings, or through recording medium 209 made of cassette tape such as rental tape.

The bit stream transmitted through broadcasting medium 208 is decrypted in decrypting portion 210. The CPTC information is detected and analyzed in CPTC detecting/analyzing portion 211 so that signals for controlling the control word and illegal view/copy are output. Here, the bit stream transmitted to cassette tape through recording medium 209 is reproduced in recording/reproducing portion 214 and input to descrambling portion 212 and CPTC detecting/analyzing portion 211. The bit stream transmitted from broadcasting medium 208 and the bit stream reproduced from recording medium 209 through recording/reproducing portion 214 are descrambled in descrambling portion 212 according to the control word output from CPTC detecting/analyzing portion 211. The signal output from descrambling portion 212 is decoded in decoding portion 213 and displayed. The bit stream transmitted from broadcasting medium 208 and recording medium 209 is recorded on cassette tape in a recording/reproducing portion 214 according to the signal output from CPTC detecting/analyzing portion 211.

Data received from program receiving portion 202 and recorded on cassette tape is made up of the scrambled audio/video bit stream and CPTC information. The configuration of the program receiving portion having decrypting portion 210, CPTC detecting/analyzing portion 211, descrambling portion 212, decoding portion 213 and recording/reproducing portion 214 will be explained with reference to FIGS. 17, 18, 19, and 20.

One embodiment of the program receiving portion of FIG. 17 receives and processes data transmitted via a broadcasting medium. Specifically, this embodiment performs conditional access and copy protection.

Referring to FIG. 17, the first embodiment of the program receiving portion comprises an IRD 222 for receiving, decoding and descrambling the bit stream transmitted from broadcasting medium 208, outputting analog audio/video data to be displayed and outputting scrambled digital audio/video data to be recorded on cassette tape, a smart card 221 for decrypting the bit stream output from IRD 222, detecting/analyzing the CPTC information, and outputting the control word and signals for controlling illegal view/copy to IRD 222 in order to perform conditional access and copy protection, a DVCR 223 for recording the digital audio/video data and CPTC information scrambled and output from IRD 222 on cassette tape, and reproducing the scrambled digital audio/video data and CPTC information recorded on cassette tape to be output to IRD 222, and a lookup table 224 for, in case that the EMM is updated by a broadcasting station for the purpose of copyright protection, storing EMM having information required to decode the CPTC information, and outputting CPTC information corresponding in reproduction to smart card 221 in order to continuously reproduce the program of copied cassette tape. Here, lookup table 221 is mapped and processed as shown in FIGS. 13, 14 and 15.

The operation of the first embodiment of the program receiving portion will be described below.

In case that a bit stream, that is, a program, is received through a broadcasting medium, the received audio/video data is scrambled digital audio/video data.

The received bit stream is decoded in IRD 222 and decrypted in smart card 221. Its CPTC information is detected and analyzed so that a signal for controlling the control word and illegal view/copy is output to IRD 222.

IRD 222 descrambles the decoded bit stream using the bit stream output from smart card 221 and signals for controlling illegal view/copy. The descrambled bit stream is output to display analog audio/video data. IRD 222 outputs the scrambled digital audio/video data and CPTC information to DVCT 223 in order to record them on cassette tape.

The scrambled digital audio/video data and CPTC information output from IRD 222 is recorded on cassette tape in DVCR 223. They are in turn reproduced in DVCR 223 and processed in the same manner that the bit stream transmitted via the broadcasting medium is descrambled and processed in IRD 222 and smart card 221. The processed result is output to be displayed on a monitor, or output to the DVCR and recopied.

Here, reproduction and recopy are made possible by the data stored in the permissible generational field, present generational field, reproducible number field, and maximum reproducible time field contained in the CPTC information.

Updated EMM is mapped and stored in lookup table 224 so that, when the EMM is updated through a broadcasting signal in a broadcasting station in order to protect copyright, the program of cassette tape copied can be continuously reproduced.

Lookup table 224 reads out the EMM containing information required to decode the CPTC information in reproducing the cassette tape. Corresponding CPTC information is output to smart card 221 to enable reproduction.

Another embodiment of the program receiving portion shown in FIG. 18 is to receive and process data transmitted through a recording medium, for instance, rental tape.

The second embodiment of the program receiving portion, as shown in FIG. 18, comprises a DVCR 232 for detecting/analyzing the CPTC information from the bit stream transmitted from the recording medium, outputting a control word and signals for controlling illegal view/copy, and reproducing scrambled digital audio/video data, and an IRD 231 for receiving the control word and signals for controlling illegal view/copy output from DVCR 232, descrambling the scrambled digital audio/video data, and outputting analog audio/video data to be displayed or recorded.

The second embodiment of the program receiving portion is to perform CPTC detection and processing carried out in the smart card of the first embodiment of the program receiving portion shown in FIG. 17. The operation of the second embodiment of the program receiving portion will be described below.

In case that the bit stream is received through the recording medium, the audio/video data reproduced through the DVCR is scrambled digital audio/video data.

The bit stream recorded in DVCR 232 is reproduced. Its CPTC information is detected and analyzed so that the control word and signal for controlling illegal view/copy is output to IRD 231. The bit stream reproduced from DVCR 232 is decoded in IRD 231. The decoded bit stream is descrambled according to the control word and signal for controlling illegal view/copy output from DVCR 232 so that analog audio/video data is output to be displayed.

IRD 231 outputs the scrambled digital audio/video data and CPTC information to DVCR 232 to record them on cassette tape. The scrambled digital audio/video data and CPTC information output from IRD 231 is recorded on cassette tape and recopied in DVCR 223.

Here, reproduction and recopy are made possible by the data stored in the permissible generational field, present generational field, reproducible number field, and maximum reproducible time field contained in the CPTC information.

Referring to FIG. 19, still another embodiment of the program receiving portion is to receive and process data transmitted through a recording medium, performing copy protection (CP).

As shown in FIG. 19, the third embodiment of the program receiving portion comprises a DVCR 243 for reproducing the scrambled digital audio/video data and CPTC information recorded on cassette tape through a recording medium, and outputting them to IRD 242, an IRD 242 for decoding/descrambling the bit stream transmitted from DVCR 243, and outputting analog audio/video data to be displayed, and a smart card 241 for decrypting the bit stream output from IRD 242, detecting/analyzing the CPTC, and outputting the control word and signals for controlling copying to IRD 222 to thereby perform CP. The operation of the third embodiment of the program receiving portion will be explained below.

In case that the bit stream is received via a recording medium, that is, through rental tape, the reproduced audio/video data is scrambled digital audio/video data.

The scrambled digital audio/video data and CPTC information reproduced from DVCR 243 are decoded in IRD 242 and decrypted in smart card 241. The CPTC information is detected and analyzed so that the control word and signal for controlling copying are output to IRD 242.

IRD 242 descrambles the decoded bit stream using the CPTC information output from smart card 241 and signals for controlling copying so that analog audio/video data is output to be displayed.

IRD 242 outputs the scrambled digital audio/video data and CPTC information to DVCR 243 in order to record them on cassette tape. The scrambled digital audio/video data and CPTC information output from IRD 242 are recorded on cassette tape in DVCR 243.

Here, reproduction and recopy are made possible by the data stored in the permissible generational field, present generational field, reproducible number field, and maximum reproducible time field contained in the CPTC information.

Figure 20:
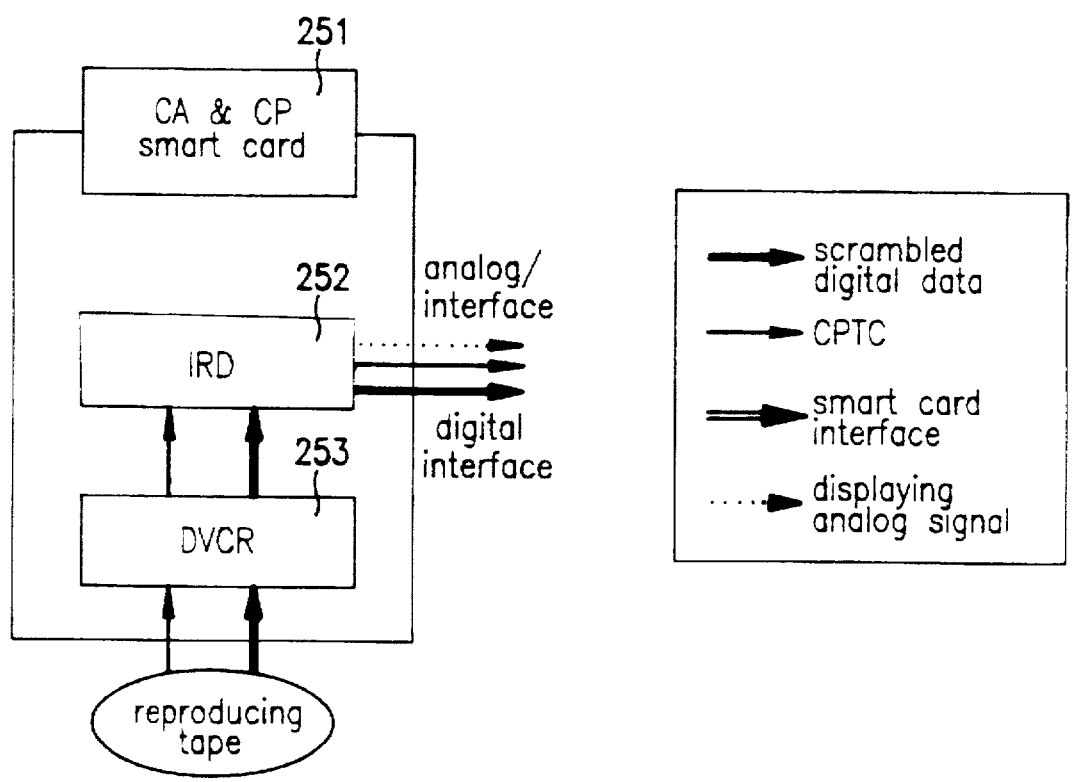
FIG. 20 is a block diagram of yet another embodiment of the program receiving portion of FIG. 16.

Referring to FIG. 20, yet another embodiment of the program receiving portion is to receive and process data transmitted through a recording medium, performing conditional access and CP. This embodiment is made in such a manner that in case of using the same CPTC information as the broadcasting medium, the smart card is commonly used.

As shown in FIG. 20, the fourth embodiment of the program receiving portion comprises a DVCR 253 for reproducing the scrambled digital audio/video data and CPTC information recorded on cassette tape through a recording medium, and outputting them to IRD 252, an IRD 252 for decoding/descrambling the bit stream transmitted from DVCR 253, and outputting analog audio/video data to be displayed, and a smart card 251 for decrypting the bit stream output from IRD 252, detecting/analyzing the CPTC, and outputting the control word and signals for controlling copying to IRD 252 to thereby perform CA and CP. The operation of the third embodiment of the program receiving portion will be explained below.

In case that the bit stream is received via a recording medium, that is, through rental tape and the DVCR, the reproduced audio/video data is scrambled digital audio/video data.

The scrambled digital audio/video data and CPTC information reproduced from DVCR 253 are decoded in IRD 252 and decrypted in smart card 251. The CPTC information is detected and analyzed so that the control word and signal for controlling copying are output back to IRD 252.

IRD 252 descrambles the decoded bit stream using the CPTC information output from smart card 251 and signals for controlling illegal view/copy so that analog audio/video data is output to be displayed.

IRD 252 outputs the scrambled digital audio/video data and CPTC information to DVCR 253 in order to record them on cassette tape. The scrambled digital audio/video data and CPTC information output from IRD 222 are recorded on cassette-tape in DVCR 253.

Here, reproduction and recopy are made possible by the data stored in the permissible generational field, present generational field, reproducible number field, and maximum reproducible time field contained in the CPTC information.

Figure 21:
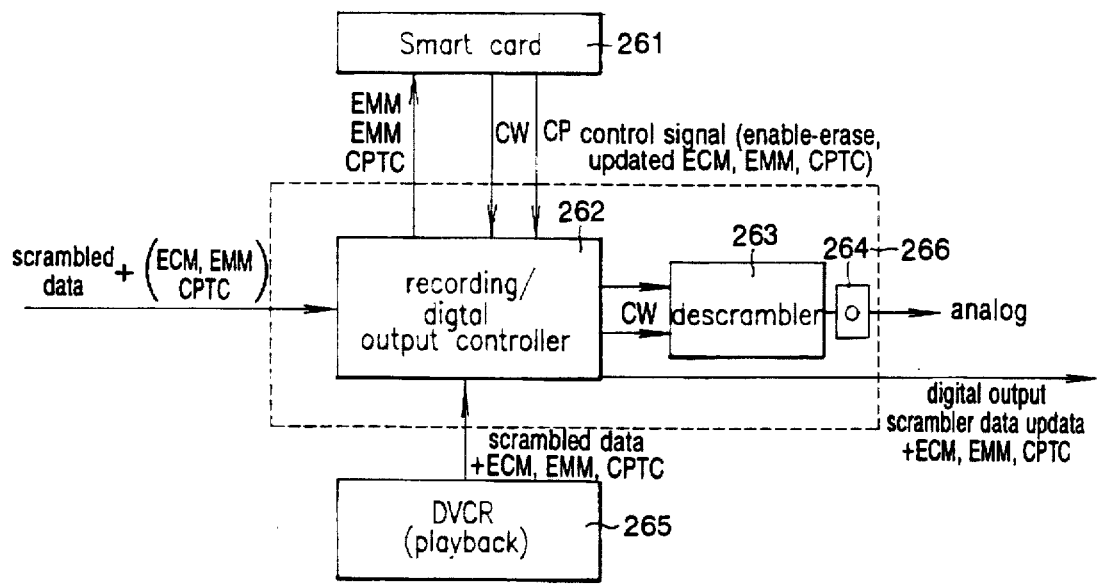
FIG. 21 is a block diagram of the IRD shown in FIGS. 17, 19 and 20.

IRD 222, 242, or 252 shown in FIG. 17, 19 or 20 is made in the following configuration as shown in FIG. 21.

Referring to FIG. 21, IRD 222, 242 or 252 comprises a recording/digital output controller 262 for decoding the bit stream transmitted from the broadcasting medium and DVCR, outputting to smart card 221, receiving the control word and signals for controlling illegal view/copy output from smart card 221, and controlling the output of the scrambled digital audio/video data for the purpose of recording and displaying; a descrambler 263 for descrambling the scrambled digital audio/video data output from recording/digital output controller 262 according to the control word output from recording/digital output controller 262, and a display processing portion 264 for processing and outputting the digital audio/video data output from descrambler 263 to be displayed. Here, DVCR 265 performs reproduction mainly. DVCR 223 of the program receiving portion of FIG. 18 combines recording therewith. The operation of IRD 266 will be described below.

The signal output to smart card 261 from recording/digital output controller 262 of IRD 266 is ECM, EMM and CPTC information. The signals output from smart card 261 to IRD 266 are the control word used to descramble and display the bit stream, and a signal for controlling copy protection.

Recording/digital output controller 262 communicates with the smart card, performs recording according to the signals of copy protection, outputs them to the digital output port in order to record them in another set, and outputs the control word and bit stream to descrambler 263.

When output to the recording/digital output port, updated ECM, EMM and CPTC information are output in addition to the scrambled data from recording/digital output controller 262 so that a copy different from the original script, that is, the broadcast or rental tape.

The ECM, EMM and CPTC are transmitted in various combinations. For the first combination, the ECM, EMM and CPTC are independently combined. The second combination is that the CPTC is included in the ECM and the EMM is independently combined. The third is that the CPTC is included in the EMM and the ECM is independently combined.

Figure 22:
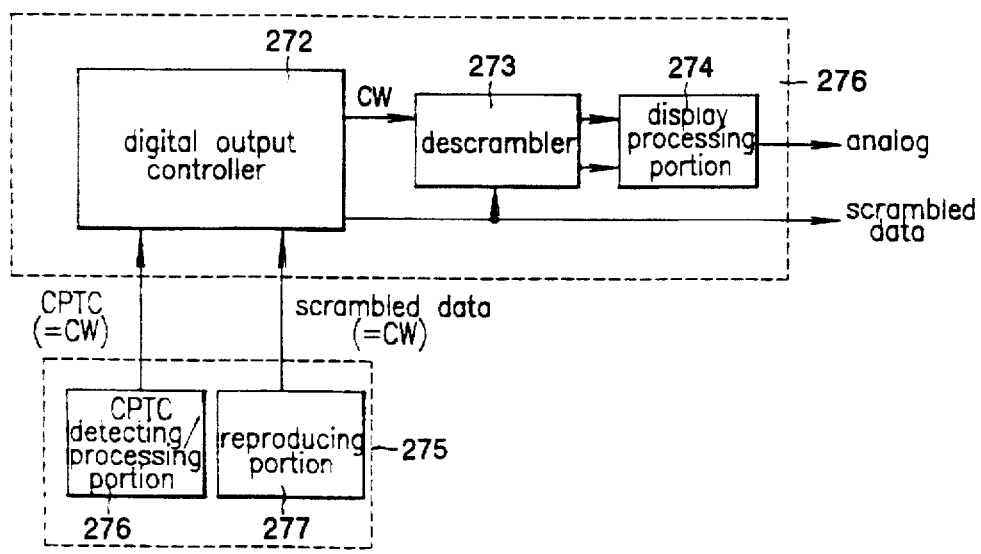
FIG. 22 is a block diagram of the IRD and DVCR of FIG. 18.

IRD 231 and DVCR 232 of FIG. 18 use the smart card, and additionally requires a CPTC detection and processing portion in the DVCR. which will be shown in FIG. 22.

DVCR 232 comprises a CPTC detecting/processing portion 276 for detecting/analyzing the CPTC information from the bit stream transmitted from recording medium 209, and outputting the control word and signals for illegal view/ copy, and a reproducing portion 277 for reproducing the bit stream transmitted from recording medium 209 and outputting it to the IRD.

IRD 231 comprises a digital output controller 272 for receiving the control word and signals for controlling illegal view/copy output from CPTC detecting/processing portion 276, and controlling the output of the scrambled digital audio/video data output from reproducing portion 277 in order to display them, a descrambler 273 for descrambling the scrambled digital audio/video data output from digital output controller 262 according to the control word output from digital output controller 262, and a display processing portion 274 for processing and outputting the digital audio/ video data output from descrambler 273 in order to display them. The operation of IRD 276 and DVCR 275 will be described below.

CPTC detecting/processing portion 276 operates separately when reproducing portion 277 reproduces the scrambled data so that the CPTC information is detected from the cassette tape.

IRD 276 receives the scrambled data, CPTC information and control word from CPTC detecting/processing portion 276 and reproducing portion 277 from DVCR 275. Therefore, for normal descrambling, the scrambled data and control word are supplied to scrambler 273 from digital output controller 272. To the digital output port, only the scrambled data is output. For this reason, in case that the reproduced data is scrambled, copying is made impossible, and vise versa.

Commonly, in order to control tape copying, the depth of generation copy and the reproduction of tape to be copied are used together. As shown in FIG. 7, this yields the effect of controlling the number of copiable tape.

However, in order to allow copying tape to be reproducible as many as a predetermined number or for a predetermined time, it is necessary to perform communication between the smart card and DVCR.

Figure 23:
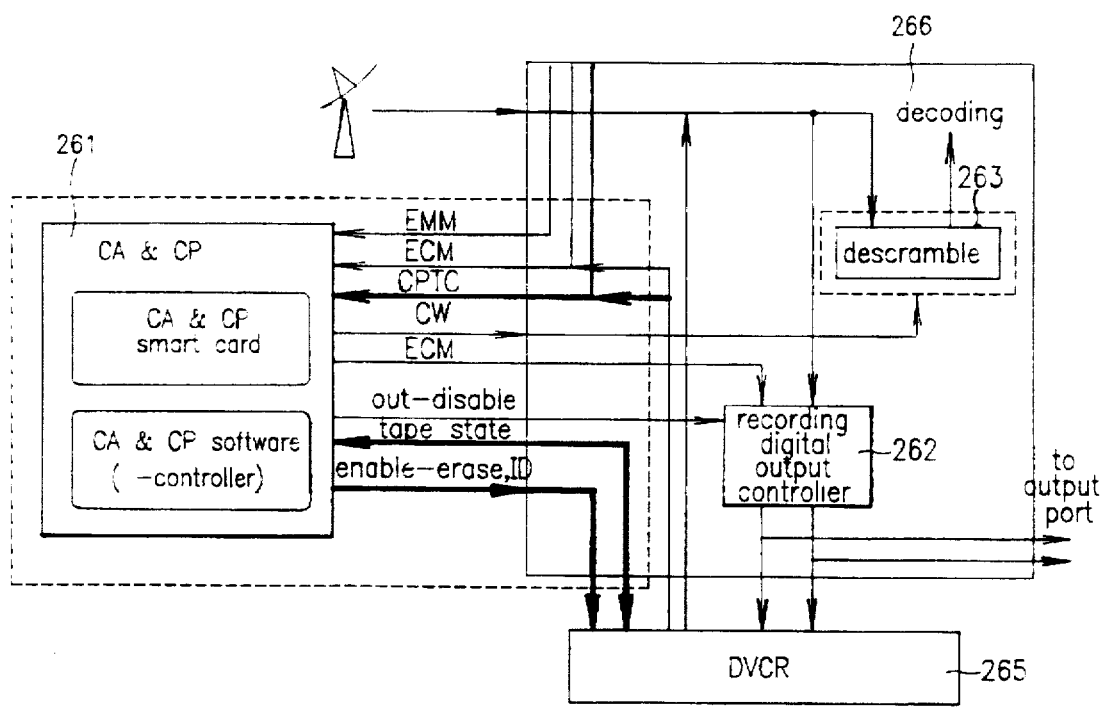
FIG. 23 illustrates the flow of signals of FIG. 21.

Referring to FIG. 23, tape state information such as the reproduction number of the current tape is transmitted to smart card 261 from DVCR 265. In order to erase the tape, an enable erase signal is transmitted to DVCR 265 from smart card 261, and the erase head of the DVCR operates.

For tape erasing methods, the whole area of tape is erased by the full-width erase head, or only the control track is erased using the control head. In case that the CPTC is contained in the EMM, signals are input and output between the DVCR and smart card.

As the signals input to IRD 266, there are a broadcasting signal transmitted from a broadcasting medium and a signal reproduced from DVCR 265. The broadcasting signal input to IRD 266 is the scrambled digital data and a control signal having the EMM, ECM and CPTC information. The EMM and ECM are required for CA, the CPTC for copyright protection.

The scrambled digital data is input to descrambler 263. The control signal is input to smart card 261 for performing CA and CP. Using the control signal, smart card 261 restores control word CW and outputs it to descrambler 263. Descrambler 263 descrambles it using the control word.

The ECM output from smart card 261 is output to DVCR 265 or to an external port. This ECM is updated from the ECM input for copyright protection. The output disable signal output from smart card 261 is a signal to instruct IRD 266 to prohibit recording or copying. This signal is input to recording/digital output controller 262. The tape state signal is output to smart card 261 from DVCR 265 in order to inform the state of tape.

The signal output to DVCR 265 from smart card 261 for the purpose of a predetermined-number reproduction or predetermined-time reproduction is an erase enable signal. The signal for allowing recorded and copied tape to be reproducible even though the EMM information of the smart card is changed is an ID signal.

The ID signal is mapped and stored with corresponding EMM in the lookup table of smart card 261. If necessary, the EMM corresponding to the ID signal is output.

Figure 24:
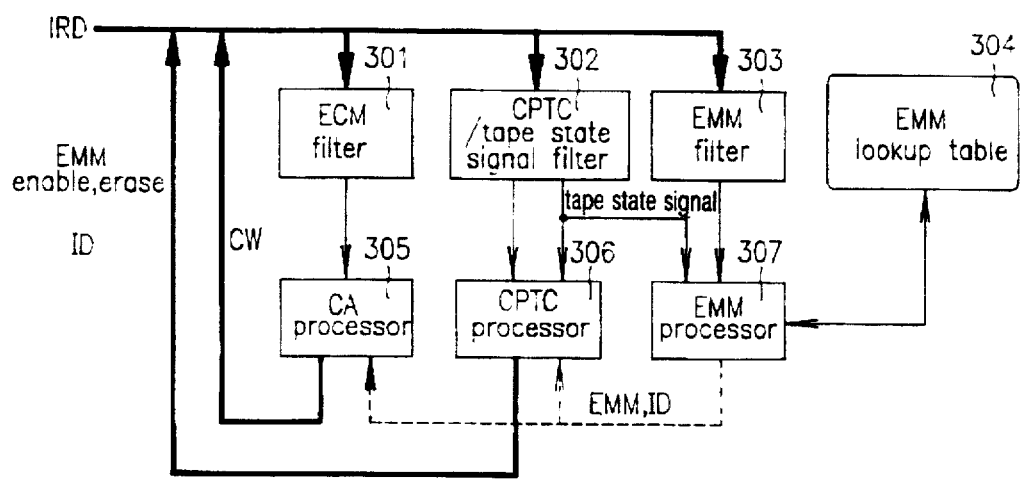
FIG. 24 is a block diagram of one embodiment of the smart card of FIG. 17.

As shown in FIG. 24, the smart card comprises an ECM filter 301 for filtering the ECM from the bit stream output from the IRD, a CPTC/tape state signal filter 302 for filtering the CPTC information and the tape state signal indicative of the state of tape from the bit stream output from the IRD, an EMM filter 303 for filtering the EMM from the bit stream output from the IRD, a lookup table 304 for, in case that the EMM is updated for copyright protection by a broadcasting station, storing the previous EMM containing information required to decode the CPTC information, and outputting CPTC information corresponding in reproduction in order to continuously reproduce the program of cassette tape copied, an EMM processing portion 307 for processing the EMM using the EMM output from EMM filter 303 and lookup table 304 and the tape state signal output from CPTC/tape state signal filter 302, a CPTC processing portion 306 for processing the CPTC information using the signals output from CPTC/tape state signal filter 302 and EMM processing portion 307, and a CA processing portion 305 for outputting control word CW using the signals output from ECM filter 301 and EMM processing portion 307.

In case that the CPTC information is contained in the EMM, as shown in FIG. 25, smart card 221 comprises an ECM filter 311 for filtering the ECM from the bit stream output from the IRD, an EMM filter 312 for filtering the EMM containing the EMM from the bit stream output from the IRD, a tape state signal filter 313 for filtering the tape state signal output from the IRD, a lookup table 314 for, in case that the EMM is updated for copyright protection by a broadcasting station, storing the previous EMM containing information required to decode the CPTC information, and outputting CPTC information corresponding in reproduction in order to continuously reproduce the program of cassette tape copied, an EMM processing portion 317 for processing the EMM using the EMM output from EMM filter 312 and lookup table 314 and the tape state signal output from tape state signal filter 313, a CPTC processing portion 316 for processing the CPTC information using the signals output from EMM filter 312 and tape state signal filter 313, to thereby output ECM, enable erase signal and ID signal, and a CA processing portion 315 for outputting control word CW using the signals output from ECM filter 311 and EMM processing portion 317.

ECM filter 301 or 311, CPTC/tape state signal filter 302, EMM filter 303 or 312, and tape state signal filter 313 extract ECM, CPTC, tape state signal and EMM, respectively. CA processing portion 305 or 315 generates a control word and performs CA. EMM processing portion 307 or 317 outputs the EMM information to CA processing portion 305 or 315 and CPTC processing portion 306 or 316, and additionally stores the received EMM to the lookup table.

In case that the scrambled digital data and encoded CPTC information are recorded on tape and that the EMM information required to decode the CPTC information is changed, the reproduction of tape is made impossible. According to this fact, the previous EMM is stored in a memory such as the EEPROM of the smart card as shown in FIGS. 13 and 14, which is the same as described before.

Specifically, the lookup table is divided into two fields and stores ID information and EMM information, as shown in FIG. 13. In recording and copying, the ID information is recorded on tape, as shown in FIG. 14 in order to select corresponding EMM from the ID information recorded in the reproduction of tape.

In other words, referring to FIG. 14, EMM processing portion 307 receives a recording/playback signal indicating that the current DVCR mode is recording or playback, ID, and tape state signal having information of reproduction number of tape, selects a proper EMM from the lookup table, outputs it to CPTC processing portion 306 or 316 and CA processing portion 305 or 315, and transmits the ID information for the purpose of recording and copying to record it on tape.

Referring to FIG. 11, CPTC processing portion 306 or 316 performs copyright protection for recording or copying. The CPTC information or ECM containing the CPTC information is input to output the output disable signal, enable erase signal, and the CPTC or ECM containing the CPTC.

In order to control generation copy, CPTC processing portion 306 or 316, in case that the permissible generation of the permissible generational field is greater than the present generation recorded on tape, the present generational field is increased by 1 and encrypted again. If not, the output disable signal is generated to prohibit recording and copying.

In order to control reproduction, in case that the reproducible number of tape is greater than the reproducible number of the reproducible number field or the maximum reproducible time of the maximum reproducible time field is greater than the current time, CPTC processing portion 306 or 316 generates enable erase signal to operate the erase head of the DVCR.

In case that time delay produced when the CPTC or the ECM containing the CPTC is encrypted again becomes a problem to solve, CPTC processing portion 306 or 316 transmits the current generation signal to the DVCR and records it on tape, not modifying the CPTC or the ECM containing the CPTC.

The illegal view/copy protection apparatus for a digital broadcasting system of the present invention has means for recording and reproducing the reproduction number information of tape in the DVCR in order to implement the predetermined-number reproducibility of recorded or copied tape. Here, the reproduction number information of tape is updated and recorded again during tape reproduction.

As shown in FIG. 26, the DVCR comprises a deck mechanism 406, a recording/reproducing portion 405 for recording digital data on cassette tape according to the deck mechanism and reproducing the digital data recorded on cassette tape, a reproduction number detecting/updating portion 401 for detecting/updating the reproduction number from the digital data reproduced from recording/reproducing portion 405, and outputting it to the IRD in order to rerecord it in recording/reproducing portion 405, a digital data processing portion 402 for processing the digital data reproduced from recording/reproducing portion 405, outputting it to the IRD, and outputting switching position information for recording and reproducing, a recording/playback switching portion 404 for outputting a switching signal for controlling the reproduction number, the reproduction of digital data and the recording of the updated reproduction number using the switching position information output from digital data processing portion 402, and an error correction encoder/decoder 403 for correcting the error of data output from digital data processing portion 402, and encoding and decoding the data to be output to digital data processing portion 402.

In order to update and rerecord the reproduction number information of tape during playback, the reproduction number information of tape is recorded using an encoding algorithm. Otherwise, the information is recorded as clear data not encoded.

The recording position of the reproduction number information of tape uses part of audio, control and video tracks. For error correction to the reproduction number information of tape, a repetition coding is employed. The operation of the DVCR will be described below.

When reproduced by recording/reproducing portion 405 with the cassette tape loaded on deck mechanism 406, the reproduced digital data is input to reproduction number detecting/updating portion 401 and digital data processing portion 402 so that its reproduction number is detected and the digital data is processed and output.

The reproduction number detected in reproduction number detecting/updating portion 401 is updated, that is, increased by 1, and applied to recording/reproducing portion 405.

Digital data processing portion 402 applies the reproduced digital data output from recording/reproducing portion 405 to error correction encoder/decoder 403 to perform error correction, encoding and decoding. The result is output to the IRD to be displayed or recorded. At the same time, the switching position information is output to recording/reproducing switching portion 404 in order to output a switching signal.

The switching signal output from recording/reproducing switching portion 404 controls recording/reproducing portion, to thereby record the updated reproduction number output from reproduction number detecting/updating portion 401, that is, the reproduction number added by 1, on tape.

Recording/reproducing switching portion 404 controls the reproduction number, the reproduction of digital data recorded on tape, and the recording of the updated reproduction number.

In another method of implementing the predetermined-number reproducibility of recorded or copied tape, an identifier is given to all tape used for a user to record broadcast programs, and the identifier given to tape and the reproducibility number information of tape corresponding to the identifier are handled together in the smart card.

Here, the smart card has a memory device which can be updated, such as EEPROM. The identifier and corresponding reproducible number information are stored in the memory device. For every reproduction of tape, the reproducible number information is updated and whether to playback is determined. In conclusion, the present invention has the following effects.

First, by adding CPTC information to data supplied, and by allowing a digital program to be normally viewed only when a CPTC detecting/analyzing means and descrambling/ decrypting means are present at the receiving stage, illegal viewing is prohibited.

Second, to enhance copyright protection, data recorded on cassette tape is always scrambled digital data, and its CPTC information is encrypted to be recorded on cassette tape. A code for prohibiting viewable data from being restored from the cassette tape only with the scrambled data and CPTC information, and allowing the data to be viewable is provided in a device excluding the cassette tape. Otherwise, restoring of viewable data is made possible only with the scrambled data and CPTC information, making illegal copy impossible.

Third, using a method of restoring the viewable data only with the scrambled digital data and CPTC, rental tape is made to supply tape. Otherwise, using a method of prohibiting the viewable data from being restored only with the scrambled digital data and CPTC, rental tape is made to supply tape and smart card peculiar to a program provider as one set. Using the smart card for broadcasting medium, the rental tape is made to prohibit the viewable data from being restored only with the scrambled digital data and CPTC. Among the three methods of supplying tape only, one method is selected Digital hardware for reproducing the data outputs only the scrambled digital data to an external port, making impossible the restoring of viewable data from the output data, without the smart card.

Fourth, the present invention prohibits illegal recording and copying of a program protected by copyright law, collects fee for recording or copying, and freely controls the reproducible number of copied tape which can be made from a program supplied by a program supplier, protecting copyright.

Fifth, the present invention can be used as a copyright protection system having a high security and multifunction with respect to a program through a broadcasting medium such as satellite and terrestrial broadcastings, or, at the same time, as a copy protection system having a high security to a program through a recording medium such as rental tape.

Sixth, the present invention is employed to digital hardware such as broadcasting receiver and digital VCR, to thereby perfectly protect a program supplier's copyright and activates digital media because of various software supplied through the digital media.

What is claimed is:

1. An illegal view/copy protection method for a digital broadcasting system comprising:
   an audio/video signal transmission step for multiplexing and transmitting an audio/video bit stream scrambled in control words and information where the control words and Copy Protection Transmission Code (CPTC) information for illegal view/copy protection are encrypted; and
   an audio/video reception step for decrypting the transmitted bit stream to analyze the CPTC information and control words, deciding whether recording is allowed or not to be recorded on digital signal storing media, and using the control words, performing descrambling and decoding to output audio/video signals to a monitor.

2. An illegal view/copy protection method for a digital broadcasting system as claimed in claim 1, wherein said CPTC information is formatted in a generational copy control field for limiting the number of copies available, and a reproducibility control field for limiting a reproduction of a copied program.

3. An illegal view/copy protection method for a digital broadcasting system as claimed in claim 2, wherein said CPTC information is formatted further containing a descrambling information field where part of the control words for descrambling are recorded.

4. An illegal view/copy protection method for a digital broadcasting system as claimed in claim 2, wherein said CPTC information is formatted to further include a Conditional Access (CA) field where CA information for conditional access is recorded.

5. An illegal view/copy protection method for a digital broadcasting system as claimed in claim 2, wherein said generational copy control field is made up of a permissible generational field for limiting the number of copy permissible and a present generational field for indicating the present generation of a program copied.

6. An illegal view/copy protection method for a digital broadcasting system as claimed in claim 2, wherein said reproduction control field is made up of a reproducible number field for limiting the number of reproducing a copied program, and a maximum reproducible time field for limiting time to reproduce the copied program.

7. An illegal view/copy protection method for a digital broadcasting system as claimed in claim 1, wherein the data recorded on the digital signal storing media contains scrambled audio/video bit stream and CPTC information.

8. An illegal view/copy protection method for a digital broadcasting system as claimed in claim 7, wherein said CPTC information is overwritten on the scrambled audio/video bit stream for error effect and recorded on the digital signal storing media.

9. An illegal view/copy protection method for a digital broadcasting system as claimed in claim 7, wherein said CPTC information is recorded on a portion of the audio track of the digital signal storing media.

10. An illegal view/copy protection method for a digital broadcasting system as claimed in claim 7, wherein said CPTC information is recorded on a portion of the control track of the digital signal storing media.

11. An illegal view/copy protection method for a digital broadcasting system as claimed in claim 7, wherein said CPTC information is recorded on a portion of the video track of the digital signal storing media.

12. An illegal view/copy protection method for a digital broadcasting system as claimed in claim 1, wherein said audio/video signal transmission step comprises the steps of:
   encoding the audio/video bit stream;
   generating a control word for scrambling;
   scrambling for the encoded audio/video bit stream using the generated control word;
   generating CPTC information for illegal view/copy protection;
   encrypting for encrypting the control word and CPTC information; and
   multiplexing and transmitting the scrambled audio/video bit stream and encrypted CPTC information.

13. An illegal view/copy protection method for a digital broadcasting system as claimed in claim 1, wherein said audio/video signal transmission step comprises the steps of:
   encoding the audio/video bit stream;
   generating a control word for scrambling;
   scrambling for the encoded audio/video bit stream using the generated control word;
   generating CPTC information for illegal view/copy protection;
   generating conditional access information for conditional reception;

encrypting for encrypting the CPTC information and CA information; and multiplexing and transmitting the scrambled audio/video bit stream and encrypted CPTC information and conditional access information.

14. An illegal view/copy protection method for a digital broadcasting system as claimed in claim 1, wherein said audio/video reception step comprises the steps of:

filtering the transmitted bit stream and decrypting the CPTC information;

analyzing the CPTC information to generate a control word and a signal for controlling the protection of copyright and to update the CPTC information;

deciding whether to allow recording according to the signal for controlling the protection of copyright to record the scrambled and transmitted bit stream on the digital signal storing media; and descrambling and decoding the transmitted bit stream in the control word and outputting an audio/video signal.

15. An illegal view/copy protection method for a digital broadcasting system as claimed in claim 14, wherein said all of the control word is contained in the CPTC information.

16. An illegal view/copy protection method for a digital broadcasting system as claimed in claim 14, wherein said CPTC information analyzing step comprises the steps of:

generating a control word;

detecting a permissible generation of a permissible generational field for limiting the available number of copy of a program of the CPTC information and the present generation of the present generational field indicating the present generation of the program copied, to thereby perform copy-impossible and update the CPTC information; and detecting the reproducible number of the reproducible number field for limiting the number of reproduction of copied programs of the CPTC information, the maximum reproducible time of the maximum reproducible time field for limiting time to reproduce the copied program, and the number and time of reproduction of tape, to thereby process reproduction-impossible.

17. An illegal view/copy protection method for a digital broadcasting system as claimed in claim 14, wherein said copying number limiting step comprises the steps of:

comparing the permissible generation of the permissible generational field and the present generation of the present generational field and deciding whether the permissible generation is below the present generation;

if the permissible generation is below the present generation, generating an output disable signal to make copying impossible and destroying the control word; and if the permissible generation is not below the present generation, increasing the present generation by '1' and recording the result on the digital signal storing media.

18. An illegal view/copy protection method for a digital broadcasting system as claimed in claim 17, wherein said copying number limiting step further comprises the step of, if the permissible generation is not below the present generation, updating the CPTC information.

19. An illegal view/copy protection method for a digital broadcasting system as claimed in claim 17, wherein said reproduction limiting step comprises the steps of:

comparing the reproducible number of the reproducible number field and the reproduction number of tape and deciding whether the reproducible number is below the reproduction number of tape;

if the reproducible number is not below the reproduction number of tape, comparing the maximum reproducible time and reproduction time of tape, and deciding whether the maximum reproducible time is below the reproduction time of tape;

if the maximum reproducible time is not below reproduction time of tape, turning off an enable erase signal to thereby enable the copied program to be reproduced; and if the reproducible number is below the reproduction number of tape or the maximum reproducible time is below the reproduction time of tape, turning on the enable erase signal to make the reproduction of the copied program impossible so that part of or the whole program recorded on the digital signal storing media is erased.

20. An illegal view/copy protection method for a digital broadcasting system as claimed in claim 13, wherein said audio/video reception step comprises the steps of:

filtering the transmitted bit stream and decrypting the CPTC information;

analyzing the CPTC information to generate a control word and a signal for controlling the protection of copyright and to update the CPTC information;

deciding whether to allow recording according to the signal for controlling the protection of copyright to record the scrambled and transmitted bit stream on the digital signal storing media; and descrambling and decoding the transmitted bit stream in the control word and outputting an audio/video signal.

21. An illegal view/copy protection apparatus for a digital broadcasting system comprising:

a program producing portion for multiplexing information encrypted both with a control word for scrambling and a Copy Protection Transmission Code (CPTC) information for prohibiting illegal view/copy, and the audio/video bit stream scrambled in control words, to thereby make a program;

a distribution medium portion for distributing programs made in said program producing portion through a transmission medium; and a program receiving portion for detecting and analyzing the CPTC information from the bit stream transmitted from said distribution medium portion and the bit stream reproduced from digital signal storing media, and descrambling and decoding the bit stream transmitted from said distribution medium portion.

22. An illegal view/copy protection apparatus for a digital broadcasting system as claimed in claim 21, wherein said program producing portion comprising:

a control word generator for generating a control word for scrambling;

a CPTC generator for generating the CPTC information for prohibiting illegal view/copy;

a scrambling portion for scrambling the audio/video bit stream using the control word output from said control word generator;

an encrypting portion for encrypting the control word output from said control word generator and the CPTC information output from said CPTC generator; and an adder for multiplexing the signals output from said scrambling portion and encrypting portion and transmitting them to said distribution medium portion.

23. An illegal view/copy protection apparatus for a digital broadcasting system as claimed in claim 21, wherein said distribution medium portion comprises:

a broadcasting medium for distributing the program made by said program producing portion through cable, satellite or terrestrial broadcasting; and a recording medium for distributing the program made by said program producing portion through digital signal storing media.

24. An illegal view/copy protection apparatus for a digital broadcasting system as claimed in claim 23, wherein said program receiving portion comprises:

a decrypting portion for decrypting the bit stream transmitted from said broadcasting medium;

a CPTC detecting/analyzing portion for detecting and analyzing the CPTC information from the bit stream output from said decrypting portion and recording medium, and outputting signals for controlling the control word and illegal view/copy;

a descrambling portion for descrambling the bit stream transmitted from said broadcasting medium and recording medium and the bit stream reproduced from the digital signal storing media;

a decoding portion for decoding and displaying the signal output from said descrambling portion; and a recording/reproducing portion for recording the bit stream transmitted from said broadcasting medium and recording medium according to the signal output from said CPTC detecting/analyzing portion, and reproducing the digital signal storing media, to thereby output the result to said descrambling portion and CPTC detecting/analyzing portion.

25. An illegal view/copy protection apparatus for a digital broadcasting system as claimed in claim 21, wherein said CPTC information is formatted in a generational copy control field for limiting the number of copies available, and a reproducibility control field for limiting a reproduction of a copied program.

26. An illegal view/copy protection apparatus for a digital broadcasting system as claimed in claim 25, wherein said reproduction control field is made up of a reproducible number field for limiting the number of reproducing a copied program, and a maximum reproducible time field for limiting time to reproduce the copied program.

27. An illegal view/copy protection apparatus for a digital broadcasting system as claimed in claim 21, wherein said program receiving portion comprises:

an Integrated Receiver/Decoder (IRD) for receiving, decoding and descrambling the bit stream transmitted from said broadcasting medium, outputting analog audio/video data to be displayed and outputting scrambled digital audio/video data to be recorded on digital signal storing media; and a smart card for decrypting the bit stream output from said IRD, detecting/analyzing the CPTC information, and outputting the control word and signals for controlling illegal view/copy to said IRD in order to perform conditional access and copy protection.

28. An illegal view/copy protection apparatus for a digital broadcasting system as claimed in claim 27, wherein said program receiving portion further comprises a Digital Video Cassette Recorder (DVCR) for recording the digital audio/video data and CPTC information scrambled and output from said IRD on the digital signal storing media, and reproducing the scrambled digital audio/video data and CPTC information recorded on the digital signal storing media to be output to said IRD.

29. An illegal view/copy protection apparatus for a digital broadcasting system as claimed in claim 28, wherein said smart card comprises:

an Entitlement Control Message (ECM) filter for filtering the ECM from the bit stream output from said IRD;

a CPTC/tape state signal filter for filtering the CPTC information and the tape state signal indicative of the state of tape from the bit stream output from said IRD;

an Entitlement Management Message (EMM) filter for filtering the EMM containing the EMM from the bit stream output from said IRD;

a lookup table for, in case that the EMM is updated for copyright protection by a broadcasting station, storing the previous EMM containing information required to decode the CPTC information, and outputting CPTC information corresponding in reproduction in order to continuously reproduce the program of digital signal storing media copied;

an EMM processing portion for processing the EMM using the EMM output from said EMM filter and lookup table and the tape state signal output from said state signal filter;

a CPTC processing portion for processing the CPTC information using the signals output from said CPTC/tape state signal filter and EMM processing portion; and a Conditional Access (CA) processing portion for outputting control word CW using the signals output from said ECM filter and EMM processing portion.

30. An illegal view/copy protection apparatus for a digital broadcasting system as claimed in claim 28, wherein said smart card comprises:

an Entitlement Control Message (ECM) filter for filtering the ECM from the bit stream output from said IRD;

an Entitlement Management Message (EMM) filter for filtering the EMM containing the EMM from the bit stream output from said IRD;

a tape state signal filter for filtering the tape state signal output from said IRD;

a lookup table for, in case that the EMM is updated for copyright protection by a broadcasting station, storing the previous EMM containing information required to decode the CPTC information, and outputting CPTC information corresponding in reproduction in order to continuously reproduce the program of digital signal storing media copied;

an EMM processing portion for processing the EMM using the EMM output from said EMM filter and lookup table and the tape state signal output from said tape state signal filter;

a CPTC processing portion for processing the CPTC information using the signals output from said EMM filter and tape state signal filter, to thereby output ECM, enable erase signal and ID signal; and a Conditional Access (CA) processing portion for outputting control word CW using the signals output from said ECM filter and EMM processing portion.

31. An illegal view/copy protection apparatus for a digital broadcasting system as claimed in claim 28, wherein said DVCR comprises:

a deck mechanism;

a recording/reproducing portion for recording digital data on digital signal storing media according to said deck mechanism and reproducing the digital data recorded on the digital signal storing media;

a reproduction number detecting/updating portion for detecting/updating the reproduction number from the digital data reproduced from said recording/reproducing portion, and outputting it to said IRD in order to rerecord it in said recording/reproducing portion;

a digital data processing portion for processing the digital data reproduced from said recording/reproducing portion, outputting it to said IRD, and outputting switching position information for recording and reproducing;

a recording/playback switching portion for outputting a switching signal for controlling the reproduction number, the reproduction of digital data and the recording of the updated reproduction number using the switching position information output from said digital data processing portion; and an error correction encoder/decoder for correcting the error of data output from said digital data processing portion, and encoding and decoding the data to be output to said digital data processing portion.

* * * * *